US012034234B2

(12) United States Patent
Wang et al.

(10) Patent No.: US 12,034,234 B2
(45) Date of Patent: Jul. 9, 2024

(54) ANTENNA AND ELECTRONIC APPARATUS

(71) Applicants: Beijing BOE Technology Development Co., Ltd., Beijing (CN); BOE Technology Group Co., Ltd., Beijing (CN)

(72) Inventors: Yali Wang, Beijing (CN); Xichao Fan, Beijing (CN); Feng Qu, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/760,243

(22) PCT Filed: Dec. 29, 2021

(86) PCT No.: PCT/CN2021/142252
§ 371 (c)(1),
(2) Date: Aug. 5, 2022

(87) PCT Pub. No.: WO2023/123004
PCT Pub. Date: Jul. 6, 2023

(65) Prior Publication Data
US 2024/0186707 A1 Jun. 6, 2024

(51) Int. Cl.
*H01Q 9/06* (2006.01)
*H01Q 19/10* (2006.01)
*H01Q 19/30* (2006.01)

(52) U.S. Cl.
CPC ............. *H01Q 9/065* (2013.01); *H01Q 19/10* (2013.01); *H01Q 19/30* (2013.01)

(58) Field of Classification Search
CPC ......... H01Q 9/065; H01Q 19/10; H01Q 19/30
See application file for complete search history.

(56) References Cited

U.S. PATENT DOCUMENTS 5,220,355 A 6/1993 Miyawaki
6,222,490 B1 4/2001 Jia-Jiu et al.

FOREIGN PATENT DOCUMENTS

CN 101656351 A 2/2010
CN 103531917 A 1/2014
(Continued)

OTHER PUBLICATIONS

Kimberley W. Eccleston, "Mode Analysis of the Corrugated Substrate Integrated Waveguide", Oct. 2012, IEEE Transactions on Microwave Theory and Techniques, vol. 60, No. 10, pp. 3004-3012 (Year: 2012).*
(Continued)

*Primary Examiner* — Daniel D Chang
(74) *Attorney, Agent, or Firm* — Intellectual Valley Law, P.C.

(57) ABSTRACT

An antenna is provided, comprising a reflector, a director; a first tapered microstrip line, a transition structure, a second tapered microstrip line, and a dipole radiator; wherein the transition structure has a main body of a parallelogram shape having a first side connected to the first tapered microstrip line, a second side opposite to the first side and connected to the second tapered microstrip line, a third side connecting the first side and the second side, and a fourth side connecting the first side and the second side, the third side being opposite to the fourth side; and the transition structure comprises a plurality of teeth connected to and extending away from at least the fourth side of the main body.

20 Claims, 29 Drawing Sheets

(56) References Cited

FOREIGN PATENT DOCUMENTS

| | | | |
|---|---|---|---|
| CN | 110380217 | A | 10/2019 |
| CN | 210779002 | U | 6/2020 |
| CN | 111682850 | A | 9/2020 |
| CN | 111786131 | A | 10/2020 |
| CN | 212011276 | U | 11/2020 |
| JP | 2009200719 | A | 9/2009 |

OTHER PUBLICATIONS

International Search Report & Written Opinion mailed Jun. 29, 2022, regarding PCT/CN2021/142252.

Ranade et al., Corrugated Substrate Integrated Waveguide Fed Broadband Tapered Slot Antenna at Ku Band, 2015 IEEE Applied Electromagnetics Conference.

Eccleston, "Mode Analysis of the Corrugated Substrate Integrated Waveguide", IEEE Transactions on Microwave Theory and Techniques, vol. 60, Issue 10, 2012.

Aboualalaa et al., "Rectenna System for RF Energy Harvesting and Wireless Power Transfer", Recent Wireless Power Transfer technologies, 2019.

* cited by examiner

ANTENNA AND ELECTRONIC APPARATUS

CROSS-REFERENCE TO RELATED APPLICATION

This application is a national stage application under 35 U.S.C. § 371 of International Application No. PCT/CN2021/142252, filed Dec. 29, 2021, the contents of which are incorporated by reference in the entirety.

TECHNICAL FIELD

The present invention relates to an antenna and an electronic apparatus.

BACKGROUND

Yagi antenna is a directional antenna consisting of two or more parallel resonant antenna elements in an end-fire array. Yagi antenna typically includes a driven element connected to a radio transmitter, a reflector, and a director.

SUMMARY

In a first aspect of the present disclosure, an antenna is provided, comprising a reflector, a director; a first tapered microstrip line, a transition structure, a second tapered microstrip line, and a dipole radiator; wherein the transition structure has a main body of a parallelogram shape having a first side connected to the first tapered microstrip line, a second side opposite to the first side and connected to the second tapered microstrip line, a third side connecting the first side and the second side, and a fourth side connecting the first side and the second side, the third side being opposite to the fourth side; and the transition structure comprises a plurality of teeth connected to and extending away from at least the fourth side of the main body.

In an embodiment of the present disclosure, the antenna comprises: a first conductive layer comprising the reflector and the director; a dielectric layer on the first conductive layer; a second conductive layer on a side of the dielectric layer away from the first conductive layer, the second conductive layer comprising the first tapered microstrip line, the transition structure, and the second tapered microstrip line, the transition structure connecting the first tapered microstrip line with the second tapered microstrip line.

In an embodiment of the present disclosure, the dipole radiator comprises a first radiator portion in the first conductive layer and a second radiator portion in the second conductive layer, the second radiator portion connecting to the first radiator portion through a via extending through the dielectric layer.

In an embodiment of the present disclosure, an orthographic projection of the reflector on a dielectric layer at least partially overlaps with an orthographic projection of the transition structure, the first tapered microstrip line, and the second tapered microstrip line on the dielectric layer.

In an embodiment of the present disclosure, the orthographic projection of the reflector on the dielectric layer covers the orthographic projection of the transition structure, the first tapered microstrip line, and the second tapered microstrip line on the dielectric layer.

In an embodiment of the present disclosure, the transition structure comprises a plurality of teeth connected to and extending away from the third side and the fourth side of the main body, respectively.

In an embodiment of the present disclosure, a unitary structure comprising the first tapered microstrip line, the transition structure, and the second tapered microstrip line has a mirror symmetry about a plane perpendicular to the transition structure.

In an embodiment of the present disclosure, a combination of the first tapered microstrip line, the transition structure, the second tapered microstrip line, the reflector, and the director has a mirror symmetry about a plane perpendicular to the transition structure and the reflector.

In an embodiment of the present disclosure, the transition structure comprises a plurality of teeth connected to and extending away from the fourth side of the main body; the first tapered microstrip line is connected to the first side at a corner between the first side and the third side; and the second tapered microstrip line is connected to the second side at a corner between the second side and the third side.

In an embodiment of the present disclosure, a combination of the reflector and the director has a mirror symmetry about a plane perpendicular to the reflector and the director.

In an embodiment of the present disclosure, the first tapered microstrip line, the transition structure, and the second tapered microstrip line are limited in only one side of the plane about which the reflector and the director has a mirror symmetry.

In an embodiment of the present disclosure, on each side of the main body having multiple teeth, the multiple teeth are spaced apart by multiple slits, respectively; the multiple teeth are equispaced; and the multiple slits are equispaced.

In an embodiment of the present disclosure, the director comprises a plurality of rods that are parallelly arranged and equispaced; and the plurality of rods have a same length.

In an embodiment of the present disclosure, the director comprises a plurality of rods that are parallelly arranged and equispaced; and lengths of the plurality of rods gradually decrease along a direction away from the reflector.

In an embodiment of the present disclosure, the first tapered microstrip line connecting the second radiator portion with the transition structure on the first side; and the first radiator portion is connected with the reflector.

In an embodiment of the present disclosure, the reflector comprises a tapered line portion and a rectangular portion; the tapered line portion connects the first radiator portion with the rectangular portion; and a line width of the tapered line portion gradually decreases along a direction from the rectangular portion to the first radiator portion.

In an embodiment of the present disclosure, a combination of the rectangular portion, the tapered line portion, and the director has a mirror symmetry about a plane perpendicular to the reflector and the director.

In an embodiment of the present disclosure, an orthographic projection of the tapered line portion on a dielectric layer completely overlaps with an orthographic projection of the first tapered microstrip line on the dielectric layer.

In an embodiment of the present disclosure, the first radiator portion comprises a first branch; the second radiator portion comprises a second branch; the first branch and the second branch are parallel to each other, and extending away from a position corresponding to the via along two opposite directions.

In a second aspect of the present disclosure, an electronic apparatus is provided, comprising the above antenna.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, an antenna and an electronic apparatus that substantially obviate one or more of the problems due to limitations and disadvantages of the related art. In one aspect, the present disclosure provides an antenna. In some embodiments, the antenna includes a reflector, a director; a first tapered microstrip line, a transition structure, a second tapered microstrip line, and a dipole radiator. Optionally, the transition structure has a main body of a parallelogram shape having a first side connected to the first tapered microstrip line, a second side opposite to the first side and connected to the second tapered microstrip line, a third side connecting the first side and the second side, and a fourth side connecting the first side and the second side, the third side being opposite to the fourth side. Optionally, the transition structure includes a plurality of teeth connected to and extending away from at least the fourth side of the main body.

Figure 1A:
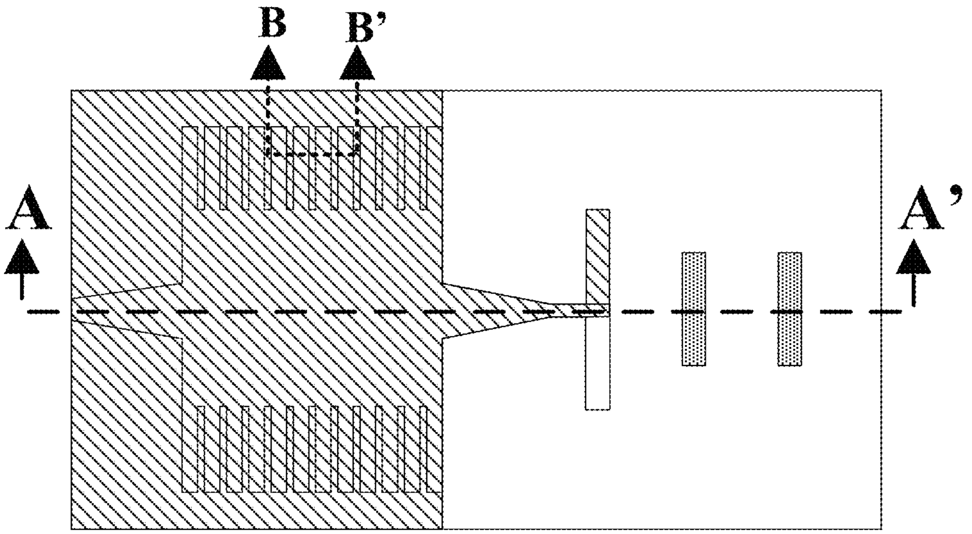
FIG. 1A is a plan view of an antenna in some embodiments according to the present disclosure.
Figure 1B:
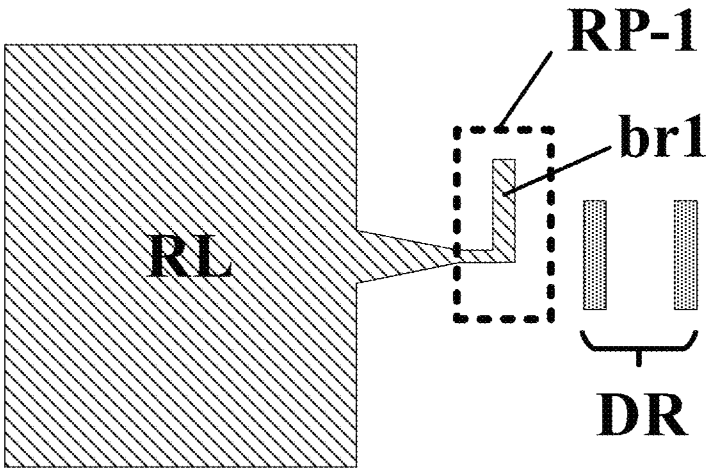
FIG. 1B illustrates the structure of a first conductive layer in an antenna depicted in FIG. 1A.
Figure 1C:
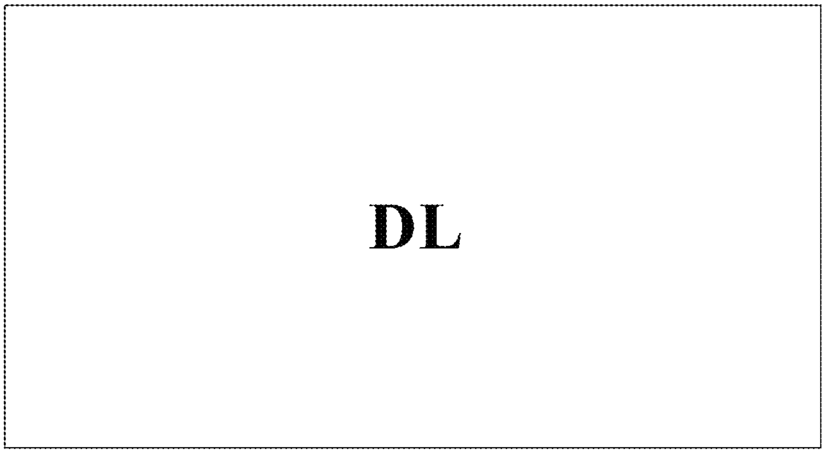
FIG. 1C illustrates the structure of a dielectric layer in an antenna depicted in FIG. 1A.
Figure 1D:
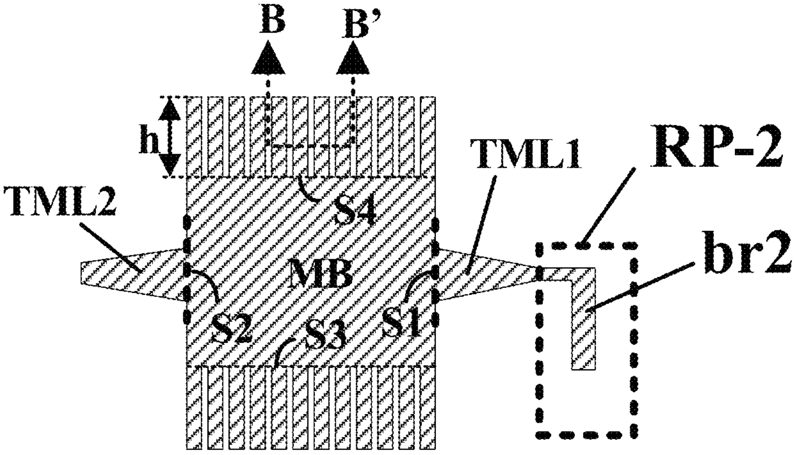
FIG. 1D illustrates the structure of a second conductive layer in an antenna depicted in FIG. 1A.
Figure 2A:
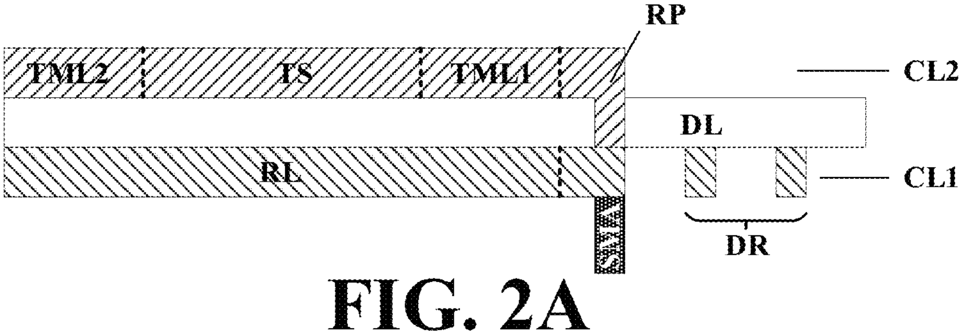
FIG. 2A is a cross-sectional view of an antenna along an A-A' line in FIG. 1A.
Figure 2B:
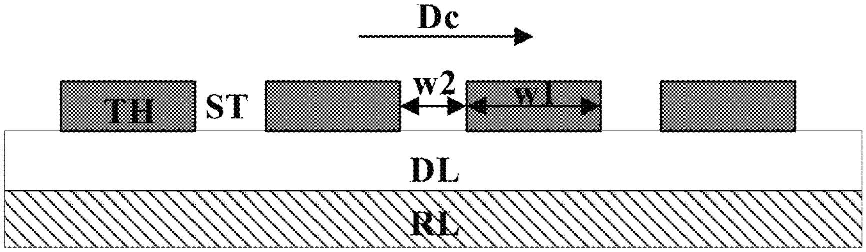
FIG. 2B is a cross-sectional view of an antenna along a B-B' line in FIG. 1A.

FIG. 1A is a plan view of an antenna in some embodiments according to the present disclosure. FIG. 1B illustrates the structure of a first conductive layer in an antenna depicted in FIG. 1A. FIG. 1C illustrates the structure of a dielectric layer in an antenna depicted in FIG. 1A. FIG. 1D illustrates the structure of a second conductive layer in an antenna depicted in FIG. 1A. FIG. 2A is a cross-sectional view of an antenna along an A-A' line in FIG. 1A. FIG. 2B is a cross-sectional view of an antenna along a B-B' line in FIG. 1A. Referring to FIG. 1A to FIG. 1D, FIG. 2A, and FIG. 2B, the antenna in some embodiments includes a reflector RL, a director DR; a first tapered microstrip line TML1, a transition structure TS, a second tapered microstrip line TML2, and a dipole radiator RP.

In some embodiments, the antenna includes a first conductive layer CL1, a dielectric layer DL on the first conductive layer CL1, and a second conductive layer CL2 on a side of the dielectric layer DL away from the first conductive layer CL1, as depicted in FIG. 2A. The first conductive layer CL1 in some embodiments includes a reflector RL and a director DR. The director DR is spaced apart from the reflector RL. The second conductive layer CL2 in some embodiments includes a first tapered microstrip line TML1, a transition structure TS, and the second tapered microstrip line TML2. Optionally, the transition structure TS connects the first tapered microstrip line TML1 with the second tapered microstrip line TML2.

In some embodiments, the antenna further includes a dipole radiator RP. Optionally, the dipole radiator RP has a two-layer structure. Referring to FIG. 2A, FIG. 1A to FIG. 1D, the dipole radiator RP in some embodiments includes a first radiator portion RP-1 in the first conductive layer CL1 and a second radiator portion RP-2 in the second conductive layer CL2. Optionally, the second radiator portion RP-2 connects to the first radiator portion RP-1 through a via extending through the dielectric layer DL.

In some embodiments, referring to FIG. 1D, the transition structure TS has a main body MB of a parallelogram shape having a first side S1 connected to the first tapered microstrip line TML1, a second side S2 opposite to the first side S1 and connected to the second tapered microstrip line TML2, a third side S3 connecting the first side S1 and the second side S2, and a fourth side S4 connecting the first side S1 and the second side S2, the third side S3 being opposite to the fourth side S4.

Various appropriate parallelogram shapes may be implemented in the present radiating patches. Optionally, the parallelogram shape is a rectangular shape. Optionally, the parallelogram shape is a square shape.

In some embodiments, referring to FIG. 2B and FIG. 1D, the transition structure TS includes a plurality of teeth connected to and extending away from at least the fourth side S4 of the main body MB. In the antenna as depicted in FIG. 1A to FIG. 1D, the transition structure TS includes a plurality of teeth connected to and extending away from the third side S3 and the fourth side S4 of the main body MB, respectively.

In some embodiments, on each side of the main body MB having multiple teeth, the multiple teeth are spaced apart by multiple slits, respectively. Referring to FIG. 1A to FIG. 1D, in some embodiments, on each of the third side S3 and the fourth side S4 of the main body MB, multiple teeth are spaced apart by multiple slits, respectively. Optionally, the multiple teeth are equispaced. Optionally, the multiple slits are equispaced. In one example, the multiple teeth on the third side S3 are equispaced, and the multiple slits on the third side S3 are equispaced. In another example, the multiple teeth on the fourth side S4 are equispaced, and the multiple slits on the fourth side S4 are equispaced. As used herein, the term equispaced means the teeth or the slits are spaced at equal distances from each other.

Referring to FIG. 2B, in some embodiments, a respective teeth TH of the multiple teeth has a first width w1 along a direction De across the multiple teeth and the multiple slits. A respective slit ST of the multiple slits has a second width w2 along the direction De across the multiple teeth and the multiple slits. Optionally, the first width w1 is greater than the second width w2.

In some embodiments, a ratio of the first width w1 to the second width w2 is in a range of 3:1 to 1:1, e.g., 3:1 to 2.5:1, 2.5:1 to 2.0:1, 2.0:1 to 1.5:1, or 1.5:1 to 1:1. In one example depicted in FIG. 2B, the ratio of the first width w1 to the second width w2 is 2:1.

In some embodiments, the first width w1 is in a range of 0.2 mm to 0.8 mm, e.g., 0.2 mm to 0.3 mm, 0.3 mm to 0.4 mm, 0.4 mm to 0.5 mm, 0.5 mm to 0.6 mm, 0.6 mm to 0.7 mm, or 0.7 mm to 0.8 mm. In one example depicted in FIG. 2B, the first width w1 is 0.4 mm.

In some embodiments, the second width w2 is in a range of 0.1 mm to 0.4 mm, e.g., 0.1 mm to 0.2 mm, 0.2 mm to 0.3 mm, or 0.3 mm to 0.4 mm. In one example depicted in FIG. 2B, the second width w2 is 0.2 mm.

In some embodiments, referring to FIG. 1D and FIG. 2B, a respective teeth TH of the multiple teeth has a length h along a direction the respective teeth TH extending away from the radiating patch RP. Optionally, the length h is in a range of 1 mm to 5 mm, e.g., 1 mm to 2 mm, 2 mm to 3 mm, 3 mm to 4 mm, or 4 mm to 5 mm. In one example depicted in FIG. 1D, the length h is 2.5 mm.

In some embodiments, the plurality of teeth are absent on the first side S1 and on the second side S2.

The respective teeth and the respective slit may have various appropriate shapes. Examples of appropriate shapes include a parallelogram shape such as a rectangular shape and a square shape, a trapezoidal shape, an inverted trapezoidal shape, and a regular polygonal shape. In one example depicted in FIG. 1D, the respective teeth and the respective slit have a rectangular shape.

In one example, a ratio of a number of teeth on the third side S3 to a number of teeth on the fourth side S4 is 1:1.

In some embodiments, a width of the first side S1 or the second side S2 is in a range of 2.5 mm to 10.5 mm, e.g., 2.5 mm to 3.5 mm, 3.5 mm to 4.5 mm, 4.5 mm to 5.5 mm, 5.5 mm to 6.5 mm, 6.5 mm to 7.5 mm, 7.5 mm to 8.5 mm, 8.5 mm to 9.5 mm, or 9.5 mm to 10.5 mm. In one example depicted in FIG. 1D, the width of the first side S1 or the second side S2 is 5 mm.

In some embodiments, a width of the third side S3 or the fourth side S4 is in a range of 3.5 mm to 14.5 mm, e.g., 3.5 mm to 4.5 mm, 4.5 mm to 5.5 mm, 5.5 mm to 6.5 mm, 6.5 mm to 7.5 mm, 7.5 mm to 8.5 mm, 8.5 mm to 9.5 mm, 9.5 mm to 10.5 mm, 10.5 mm to 11.5 mm, 11.5 mm to 12.5 mm, 12.5 mm to 13.5 mm, or 13.5 mm to 14.5 mm. In one example depicted in FIG. 1D, the width of the third side S3 or the fourth side S4 is 7 mm.

In some embodiments, a line width of the first tapered microstrip line TML1 gradually decreases along a direction by which the first tapered microstrip line TML1 extends away from the transition structure TS. Optionally, a ratio of a maximum width to a minimum width of the first tapered microstrip line TML1 is in a range of 3:1 to 6:1, e.g., 3.0:1 to 3.5:1, 3.5:1 to 4.0:1, 4.0:1 to 4.5:1, 4.5:1 to 5.0:1, 5.0:1 to 5.5:1, or 5.5:1 to 6.0:1. In one example depicted in FIG. 1D, the maximum width of the first tapered microstrip line TML1 is 1.4 mm, and a minimum width of the first tapered microstrip line TML1 is 0.3 mm.

In some embodiments, a line width of the second tapered microstrip line TML2 gradually decreases along a direction by which the second tapered microstrip line TML2 extends away from the transition structure TS. Optionally, a ratio of a maximum width to a minimum width of the second tapered microstrip line TML2 is in a range of 1.5:1 to 4:1, e.g., 1.5:1 to 2.0:1. 2.0:1 to 2.5:1, 2.5:1 to 3.0:1, 3.0:1 to 3.5:1, or 3.5:1 to 4.0:1. In one example depicted in FIG. 1D, the maximum width of the second tapered microstrip line TML2 is 1.6 mm, and a minimum width of the second tapered microstrip line TML2 is 0.66 mm.

In some embodiments, an orthographic projection of the reflector RL on the dielectric layer DL at least partially (e.g., at least 50%, at least 60%, at least 70%, at least 80%, at least 90%, at least 95%, at least 98%, at least 99%, or 100%) overlaps with an orthographic projection of the transition structure TS, the first tapered microstrip line TML1, and the second tapered microstrip line TML2 on the dielectric layer DL. Optionally, the orthographic projection of the reflector RL on the dielectric layer DL covers the orthographic projection of the transition structure TS, the first tapered microstrip line TML1, and the second tapered microstrip line TML2 on the dielectric layer DL.

In some embodiments, a width of the reflector RL is a sum of a width of the second tapered microstrip line TML2, a width of the transition structure TS, and a width of first tapered microstrip line TML1 along the direction De as shown in FIG. 2B.

In some embodiments, a unitary structure including the first tapered microstrip line TML1, the transition structure TS, and the second tapered microstrip line TML2 has a mirror symmetry about a plane perpendicular to the transition structure TS. An intersection line where the mirror symmetry plane intersects with the antenna is indicated by the A-A' line in FIG. 1A. Optionally, the transition structure TS has a mirror symmetry about the plane perpendicular to the transition structure TS. Optionally, the first tapered microstrip line TML1 has a mirror symmetry about the plane perpendicular to the transition structure TS. Optionally, the second tapered microstrip line TML2 has a mirror symmetry about the plane perpendicular to the transition structure TS.

In some embodiments, a combination of the reflector RL and the director DR has a mirror symmetry about a plane perpendicular to the reflector RL and the director DR. An intersection line where the mirror symmetry plane intersects with the antenna is indicated by the A-A' line in FIG. 1A. Optionally, the reflector RL has a mirror symmetry about the plane perpendicular to the reflector RL and the director DR. Optionally, the director DR has a mirror symmetry about the plane perpendicular to the reflector RL and the director DR.

In some embodiments, a combination of the first tapered microstrip line TML1, the transition structure TS, the second tapered microstrip line TML2, the reflector RL, and the director DR has a mirror symmetry about a plane perpendicular to the transition structure TS and the reflector RL. An intersection line where the mirror symmetry plane intersects with the antenna is indicated by the A-A' line in FIG. 1A.

Figure 1E:
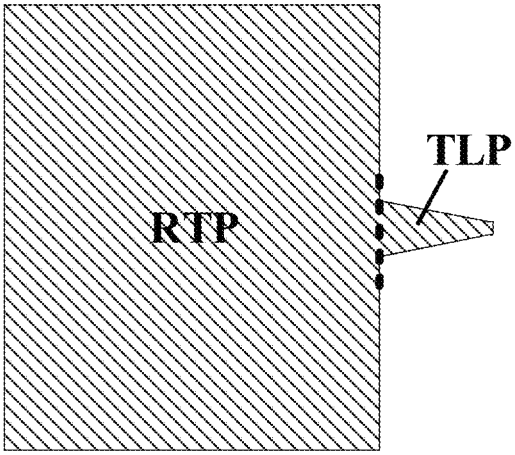
FIG. 1E illustrates the structure of a reflector in an antenna depicted in FIG. 1A.

FIG. 1E illustrates the structure of a reflector in an antenna depicted in FIG. 1A. Referring to FIG. 1E, the reflector RL in some embodiments includes a tapered line portion TLP and a rectangular portion RTP connected together as a unitary structure. Referring to FIG. 1B and FIG. 1E, he tapered line portion TLP connects the first radiator portion RP-1 with the rectangular portion RTP. A line width of the tapered line portion TLP gradually decreases along a direction from the rectangular portion RTP to the first radiator portion RP-1, e.g., along the direction Dc as shown in FIG. 2B.

In some embodiments, a combination of the rectangular portion RTP, the tapered line portion TLP, and the director DR has a mirror symmetry about a plane perpendicular to the reflector RL and the director DR. An intersection line where the mirror symmetry plane intersects with the antenna is indicated by the A-A' line in FIG. 1A.

In some embodiments, an orthographic projection of the tapered line portion TLP on the dielectric layer DL completely overlaps with an orthographic projection of the first tapered microstrip line TML1 on the dielectric layer DL.

In some embodiments, a ratio of a maximum width to a minimum width of the tapered line portion TLP is in a range of 3:1 to 6:1, e.g., 3.0:1 to 3.5:1, 3.5:1 to 4.0:1, 4.0:1 to 4.5:1, 4.5:1 to 5.0:1, 5.0:1 to 5.5:1, or 5.5:1 to 6.0:1. In one example depicted in FIG. 1B and FIG. 1E, the maximum width of the tapered line portion TLP is 1.4 mm, and a minimum width of the tapered line portion TLP is 0.3 mm.

In one example depicted in FIG. 1E, the rectangular portion RTP has a length of 12.0 mm and a width of 10.0 mm.

In some embodiments, the dipole radiator RP in some embodiments includes a first radiator portion RP-1 in the first conductive layer CL1 and a second radiator portion RP-2 in the second conductive layer CL2. Optionally, the second radiator portion RP-2 connects to the first radiator portion RP-1 through a via extending through the dielectric layer DL. The first tapered microstrip line TML1 connects the second radiator portion RP-2 with the transition structure TS on the first side S1. The first radiator portion RP-1 is connected with the reflector RL, e.g., connected with the tapered line portion TLP of the reflector RL.

In some embodiments, the first radiator portion RP-1 includes a first branch br1, and the second radiator portion RP-2 includes a second branch br2. The first branch br1 and the second branch br2 are parallel to each other, and extending away from each other along two opposite directions. For example, the second radiator portion RP-2 connects to the first radiator portion RP-1 through a via extending through the dielectric layer DL, and the first branch br1 and the second branch br2 extend away from a position corresponding to the via along two opposite directions.

In one example, the first radiator portion RP-1 (including the first branch br1) and the second radiator portion RP-2 (including the second branch br2) have a line width of 0.6 mm. In another example, the first branch br1 has a length of 2.9 mm. In another example, the second branch br2 has a length of 2.9 mm.

In some embodiments, the director DR includes a plurality of rods that are parallelly arranged and equispaced. In one example depicted in FIG. 1A, the plurality of rods have a same length.

The inventors of the present disclosure, surprisingly and unexpectedly, discover that, by having the unique structure according to the present disclosure, an antenna with an ultra-wide bandwidth can be achieved.

Figure 3A:
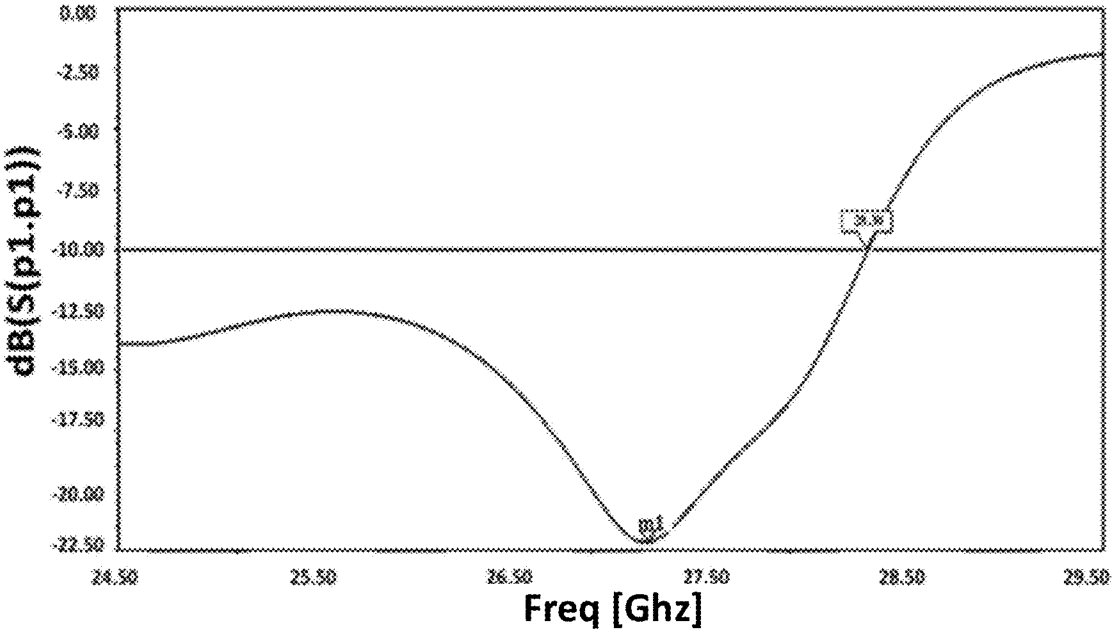
FIG. 3A illustrates an S11 graph of the antenna depicted in FIG. 1A.

In one specific example, the antenna has an overall thickness of $0.03\lambda_0$, wherein $\lambda_0$ stands for a wavelength in vacuum of a radiation produced by the antenna. The transition structure TS has a length of 10 mm and a width of 7 mm. A total number of teeth on the third side S3 or the fourth side S4 is 12. A respective tooth has a length of 2.5 mm and a width of 0.4 mm. A respective slit has a width of 0.2 mm. The director has a total of two rods of a same length and are arranged parallelly and equispaced. FIG. 3A illustrates an S11 graph of the antenna depicted in FIG. 1A. Referring to FIG. 3A, the antenna has a resonant frequency at 27.2 GHz, and a −10 dB impedance bandwidth ranging from 24.5 GHZ to 28.3 GHZ. The bandwidth of the antenna substantially covers 5G commercial millimeter bandwidth.

Figure 3B:
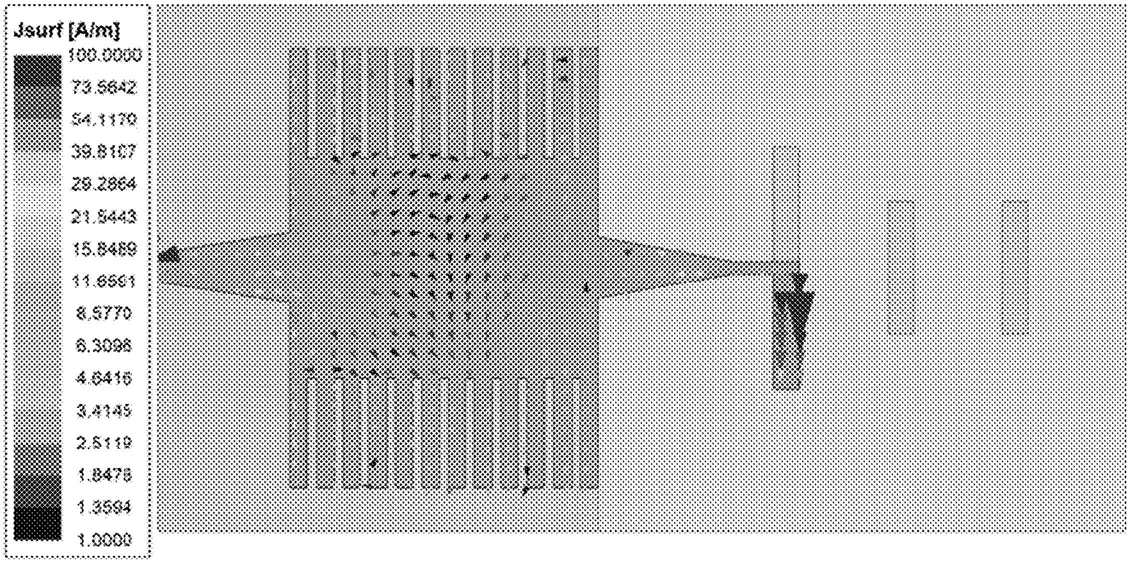
FIG. 3B illustrates current distribution in an antenna depicted in FIG. 1A.

FIG. 3B illustrates current distribution in an antenna depicted in FIG. 1A. Referring to FIG. 3B, the current distribution in the transition structure has a pseudo-mirror symmetry along a plane perpendicular to the transition structure and intersecting the third side to the fourth side of the main body. The antenna has an increased current distribution along four sides of the main body and in the plurality of teeth of the transition structure as compared to a center of the main body where a relatively small current intensity is observed.

Figure 3C:
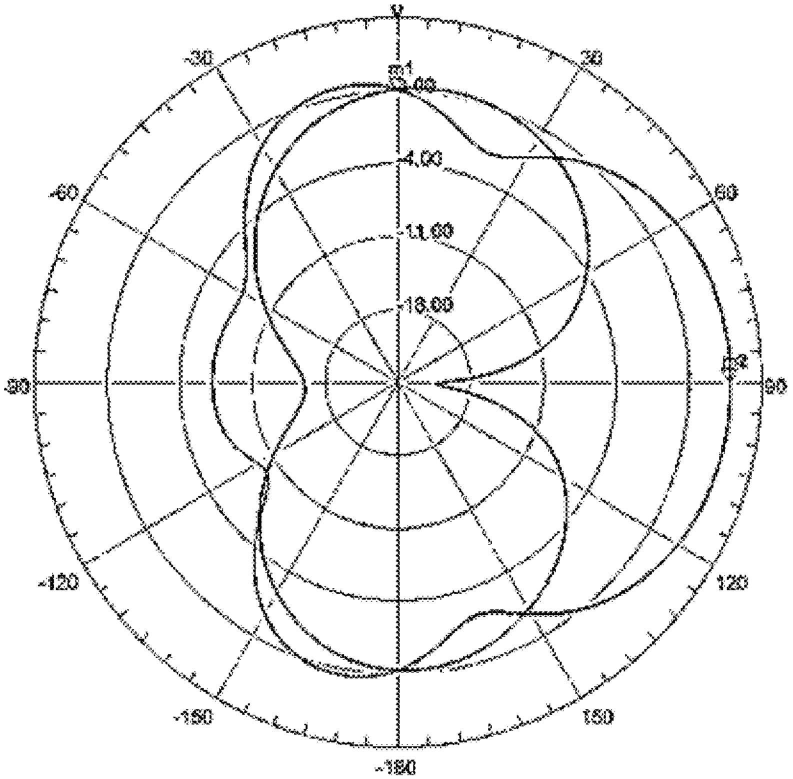
FIG. 3C illustrates an antenna radiation pattern in a E-plane and an H-plane of the antenna depicted in FIG. 1A at a resonant frequency point.
Figure 3D:
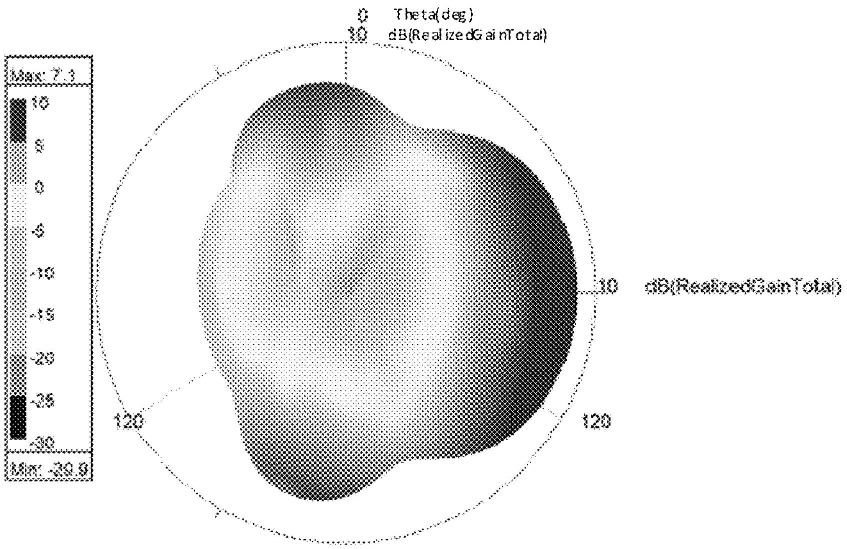
FIG. 3D illustrates a front view of an antenna radiation three-dimensional pattern of the antenna depicted in FIG. 1A at a resonant frequency point.

FIG. 3C illustrates an antenna radiation pattern in a E-plane and an H-plane of the antenna depicted in FIG. 1A at a resonant frequency point. FIG. 3D illustrates a front view of an antenna radiation three-dimensional pattern of the antenna depicted in FIG. 1A at a resonant frequency point. Referring to FIG. 3C and FIG. 3D, a maximum radiation is observed along a direction parallel to the antenna plane, and the radiation is a terminal-emitting radiation. The antenna has a sufficiently broad radiation beam along the direction of the maximum radiation, and having quasi-omnidirectional radiation characteristics, with a maximum radiation gain of 7.0 dBi. The antenna has a relatively low overall profile, a relatively high gain, and quasi-omnidirectional radiation characteristics. The present antenna can easily meet the requirements of wireless communication system designed for 5G millimeter wave band.

Figure 4A:
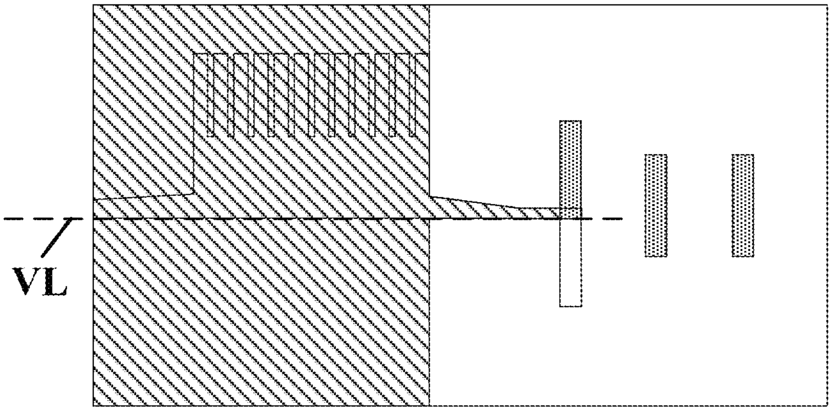
FIG. 4A is a plan view of an antenna in some embodiments according to the present disclosure.
Figure 4B:
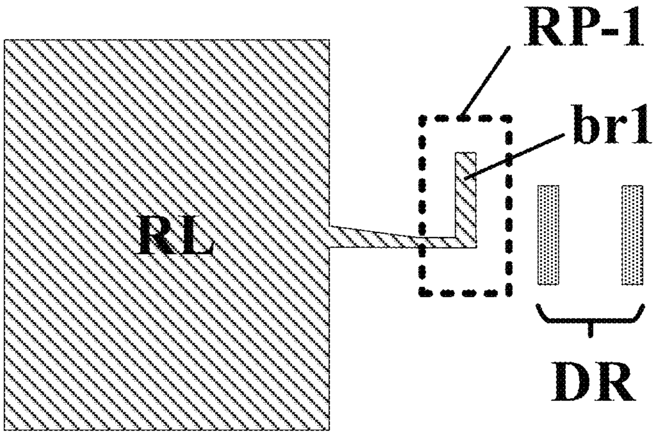
FIG. 4B illustrates the structure of a first conductive layer in an antenna depicted in FIG. 4A.
Figure 4C:
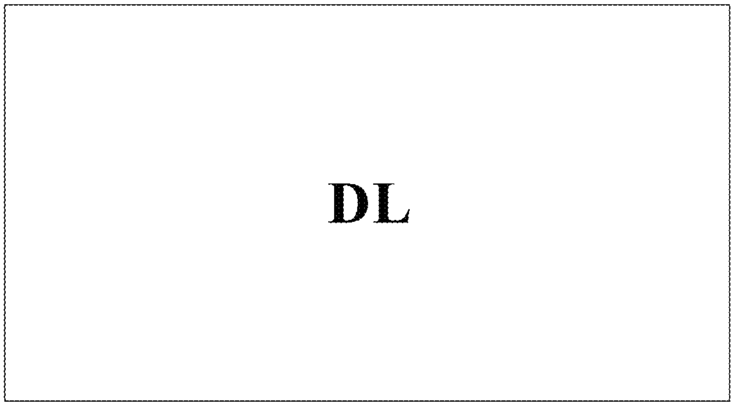
FIG. 4C illustrates the structure of a dielectric layer in an antenna depicted in FIG. 4A.
Figure 4D:
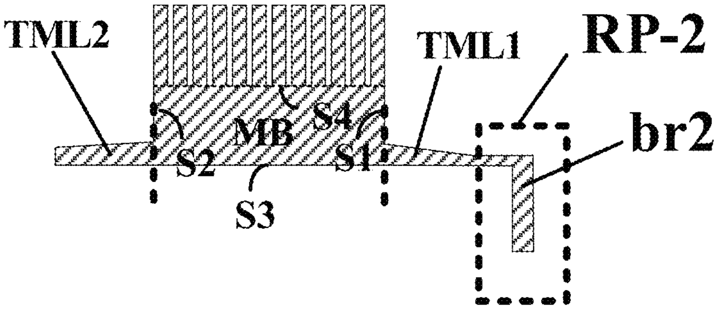
FIG. 4D illustrates the structure of a second conductive layer in an antenna depicted in FIG. 4A.

FIG. 4A is a plan view of an antenna in some embodiments according to the present disclosure. FIG. 4B illustrates the structure of a first conductive layer in an antenna depicted in FIG. 4A. FIG. 4C illustrates the structure of a dielectric layer in an antenna depicted in FIG. 4A. FIG. 4D illustrates the structure of a second conductive layer in an antenna depicted in FIG. 4A. Referring to FIG. 4A to FIG. 4D, the antenna in some embodiments includes a half-mode transition structure. Comparing the antenna in FIG. 4A with the antenna in FIG. 1A, the transition structure in the antenna in FIG. 4A is half of the transition structure in the antenna in FIG. 1A.

In some embodiments, referring to FIG. 4A to FIG. 4D, the transition structure TS includes a plurality of teeth connected to and extending away from the fourth side S4 of the main body MB. The plurality of teeth are absent in the first side S1, the second side S2, and the third side S3.

In some embodiments, the first tapered microstrip line TML1 is connected to the first side S1 at a corner between the first side S1 and the third side S3; and the second tapered microstrip line TML2 is connected to the second side S2 at a corner between the second side S2 and the third side S3. Optionally, a same virtual line VL overlaps with an edge of the main body MB along the third side S3, an edge of the first tapered microstrip line TML1 along a longitudinal side of the first tapered microstrip line TML1, and an edge of the second tapered microstrip line TML2 along a longitudinal side of the second tapered microstrip line TML2.

In some embodiments, a combination of the reflector and the director has a mirror symmetry about a plane perpendicular to the reflector and the director. An intersection line where the mirror symmetry plane intersects with the antenna is indicated by the virtual line VL in FIG. 4A.

Optionally, a combination of the transition structure TS, the first tapered microstrip line TML1, and the second tapered microstrip line TML2 do not have a mirror symmetry about the mirror symmetry plane intersecting the antenna through the virtual line VL. Optionally, the transition structure TS does not have a mirror symmetry about the mirror symmetry plane intersecting the antenna through the virtual line VL.

In some embodiments, the first tapered microstrip line TML1, the transition structure TS, and the second tapered microstrip line TML2 are limited in only one side of the plane about which the reflector RL and the director DR has a mirror symmetry. In one example, the first tapered microstrip line TML1, the transition structure TS, and the second tapered microstrip line TML2 are limited in only one side of the virtual line VL.

In some embodiments, a width of the first side S1 or the second side S2 is in a range of 1.25 mm to 5 mm, e.g., 1.25 mm to 1.5 mm, 1.5 mm to 2.0 mm, 2.0 mm to 2.5 mm, 2.5 mm to 3.0 mm, 3.0 mm to 3.5 mm, 3.5 mm to 4.0 mm, 4.0 mm to 4.5 mm, or 4.5 mm to 5.0 mm. In one example depicted in FIG. 4D, the width of the first side S1 or the second side S2 is 2.5 mm.

In some embodiments, a width of the third side S3 or the fourth side S4 is in a range of 3.5 mm to 14.5 mm, e.g., 3.5 mm to 4.5 mm, 4.5 mm to 5.5 mm, 5.5 mm to 6.5 mm, 6.5 mm to 7.5 mm, 7.5 mm to 8.5 mm, 8.5 mm to 9.5 mm, 9.5 mm to 10.5 mm. 10.5 mm to 11.5 mm, 11.5 mm to 12.5 mm, 12.5 mm to 13.5 mm, or 13.5 mm to 14.5 mm. In one example depicted in FIG. 4D, the width of the third side S3 or the fourth side S4 is 7 mm.

In some embodiments, a line width of the first tapered microstrip line TML1 gradually decreases along a direction by which the first tapered microstrip line TML1 extends away from the transition structure TS. Optionally, a ratio of a maximum width to a minimum width of the first tapered microstrip line TML1 is in a range of 1.5:1 to 5:1, e.g., 1.5:1 to 2.0:1, 2.0:1 to 2.5:1, 2.5:1 to 3.0:1, 3.0:1 to 3.5:1, 3.5:1 to 4.0:1, 4.0:1 to 4.5:1, 4.5:1 to 5.0:1, or 5.0:1 to 5.5:1. In one example depicted in FIG. 4D, the maximum width of the first tapered microstrip line TML1 is 0.7 mm, and a minimum width of the first tapered microstrip line TML1 is 0.3 mm.

In some embodiments, a line width of the second tapered microstrip line TML2 gradually decreases along a direction by which the second tapered microstrip line TML2 extends away from the transition structure TS. Optionally, a ratio of a maximum width to a minimum width of the second tapered microstrip line TML2 is in a range of 1.1:1 to 2.5:1, e.g., 1.1:1 to 1.2:1, 1.2:1 to 1:3:1, 1.3:1 to 1.4:1, 1.4:1 to 1.5:1, 1.5:1 to 1.6:1, 1.6:1 to 1.7:1, 1.7:1 to 1.8:1, 1.8:1 to 1.9:1, 1.9:1 to 2.0:1, 2.0:1 to 2.1:1, 2.1:1 to 2.2:1, 2.2:1 to 2.3:1, 2.3:1 to 2.4:1, or 2.4:1 to 2.5:1. In one example depicted in FIG. 4D, the maximum width of the second tapered microstrip line TML2 is 0.8 mm, and a minimum width of the second tapered microstrip line TML2 is 0.66 mm.

Other parameters of the antenna depicted in FIG. 4A that are not specifically discussed are the same or substantially the same as the corresponding parameters of the antenna depicted in FIG. 1A.

The inventors of the present disclosure, surprisingly and unexpectedly, discover that, by having the unique structure according to the present disclosure, an antenna with an ultra-wide bandwidth can be achieved.

Figure 5A:
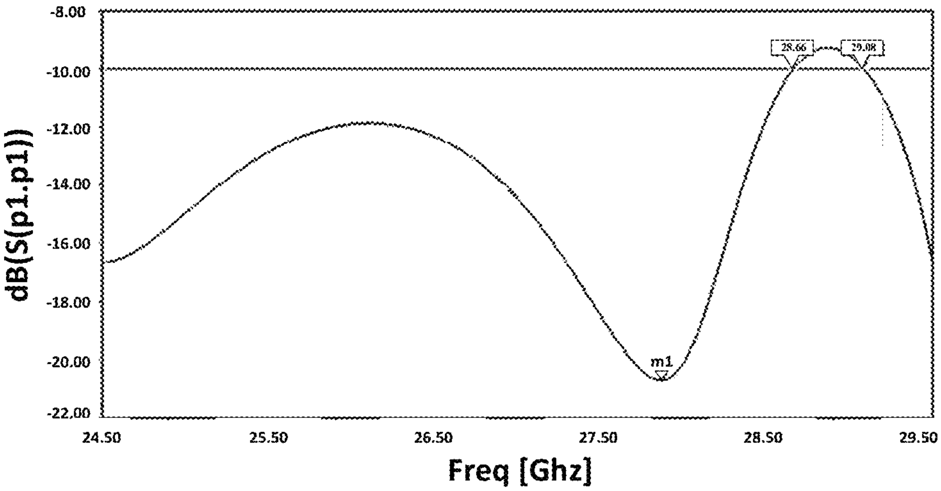
FIG. 5A illustrates an S11 graph of the antenna depicted in FIG. 4A.

In one specific example, the antenna has an overall thickness of $0.03\lambda_0$, wherein $\lambda_0$ stands for a wavelength in vacuum of a radiation produced by the antenna. The transition structure TS has a length of 7 mm and a width of 5 mm. A total number of teeth on the third side S3 is 12. A respective tooth has a length of 2.5 mm and a width of 0.4 mm. A respective slit has a width of 0.2 mm. The director has a total of two rods of a same length and are arranged parallelly and equispaced. FIG. 5A illustrates an S11 graph of the antenna depicted in FIG. 4A. Referring to FIG. 5A, the antenna has a resonant frequency at 27.875 GHZ, and a −10 dB impedance bandwidth ranging from 24.5 GHz to 28.66 GHz. The bandwidth of the antenna substantially covers 5G commercial millimeter bandwidth.

Figure 5B:
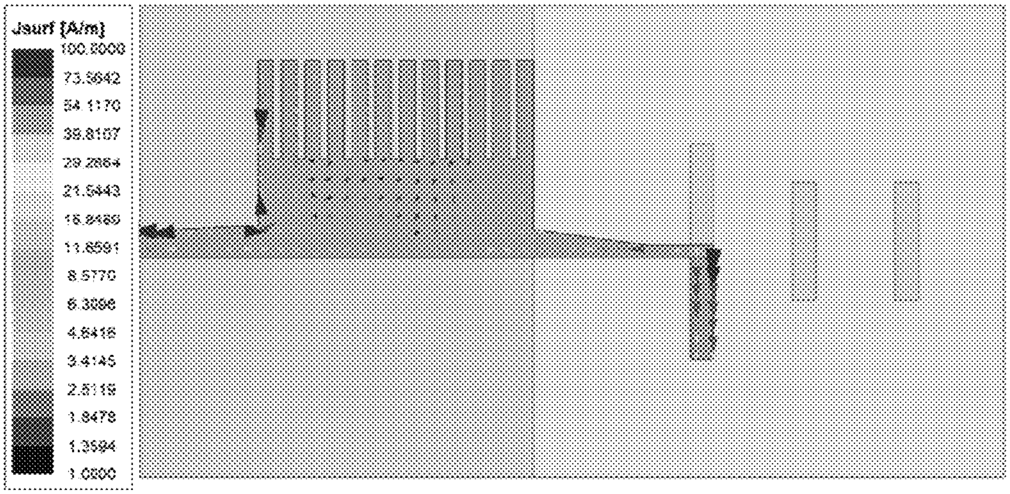
FIG. 5B illustrates current distribution in an antenna depicted in FIG. 4A.

FIG. 5B illustrates current distribution in an antenna depicted in FIG. 4A. Referring to FIG. 5B, the antenna has an increased current distribution along four sides of the main body and in the plurality of teeth of the transition structure as compared to a center of the main body where a very small current intensity is observed.

Figure 5C:
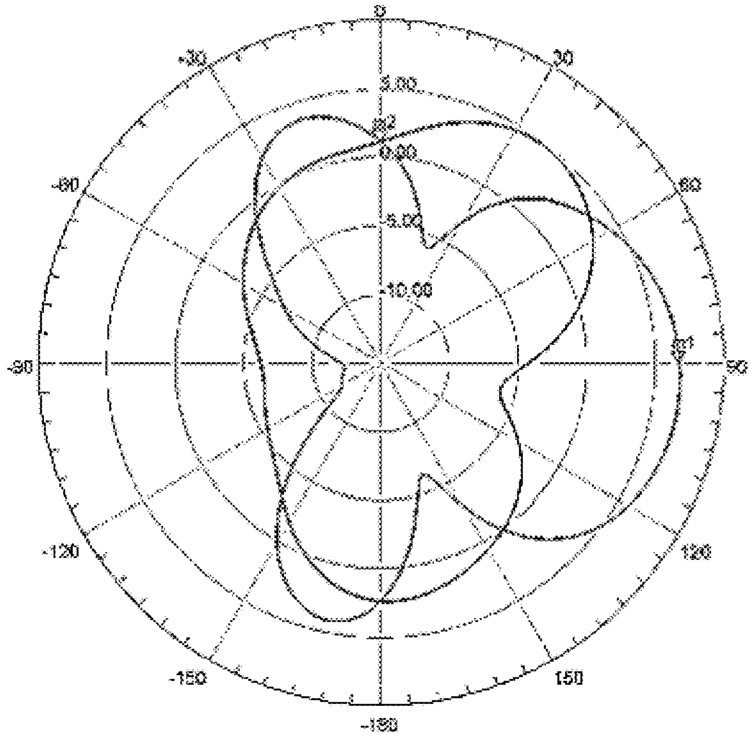
FIG. 5C illustrates an antenna radiation pattern in a E-plane and an H-plane of the antenna depicted in FIG. 4A at a resonant frequency point.
Figure 5D:
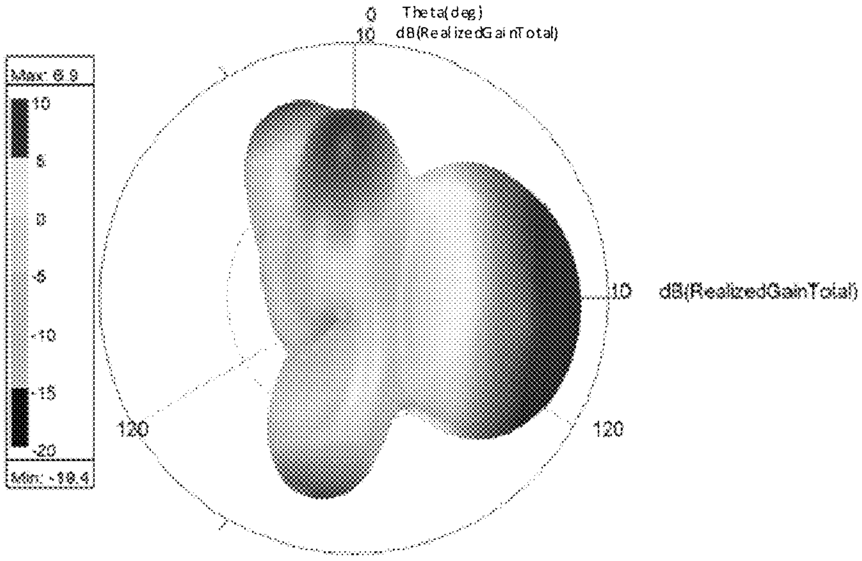
FIG. 5D illustrates a front view of an antenna radiation three-dimensional pattern of the antenna depicted in FIG. 4A at a resonant frequency point.

FIG. 5C illustrates an antenna radiation pattern in a E-plane and an H-plane of the antenna depicted in FIG. 4A at a resonant frequency point. FIG. 5D illustrates a front view of an antenna radiation three-dimensional pattern of the antenna depicted in FIG. 4A at a resonant frequency point. Referring to FIG. 5C and FIG. 5D, a maximum radiation is observed along a direction parallel to the antenna plane, and the radiation is a terminal-emitting radiation. The antenna has a sufficiently broad radiation beam along the direction of the maximum radiation, and having quasi-omnidirectional radiation characteristics, with a maximum radiation gain of 6.8 dBi. The antenna has a relatively low overall profile, a relatively high gain, and quasi-omnidirectional radiation characteristics. The present antenna can easily meet the requirements of wireless communication system designed for 5G millimeter wave band. As compared to the antenna depicted in FIG. 1A, the antenna depicted in FIG. 4A has a reduced radiation beam width.

Figure 6A:
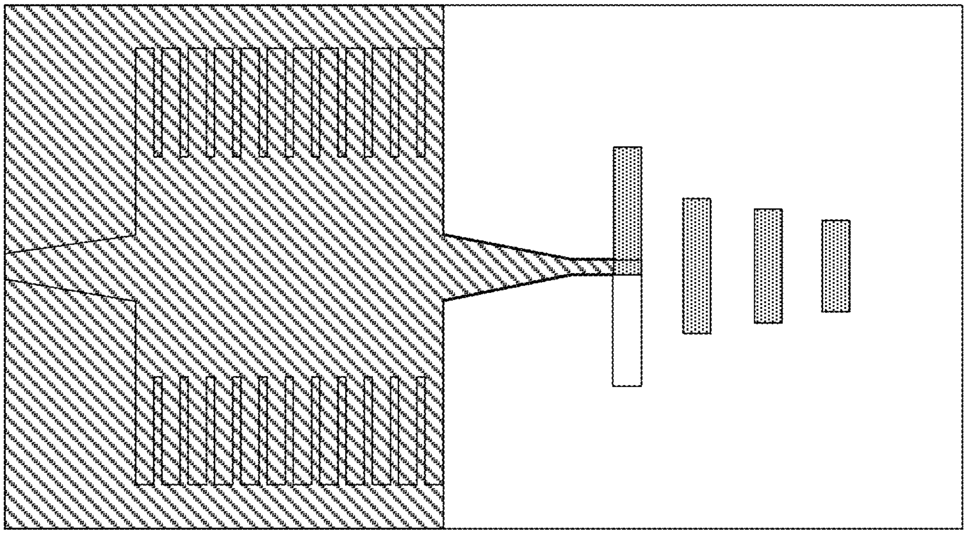
FIG. 6A is a plan view of an antenna in some embodiments according to the present disclosure.
Figure 6B:
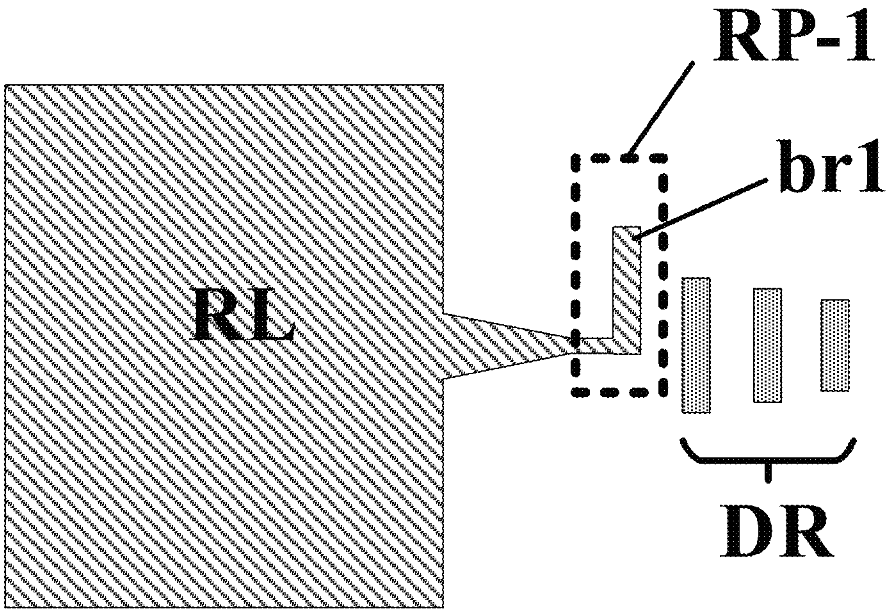
FIG. 6B illustrates the structure of a first conductive layer in an antenna depicted in FIG. 6A.
Figure 6C:
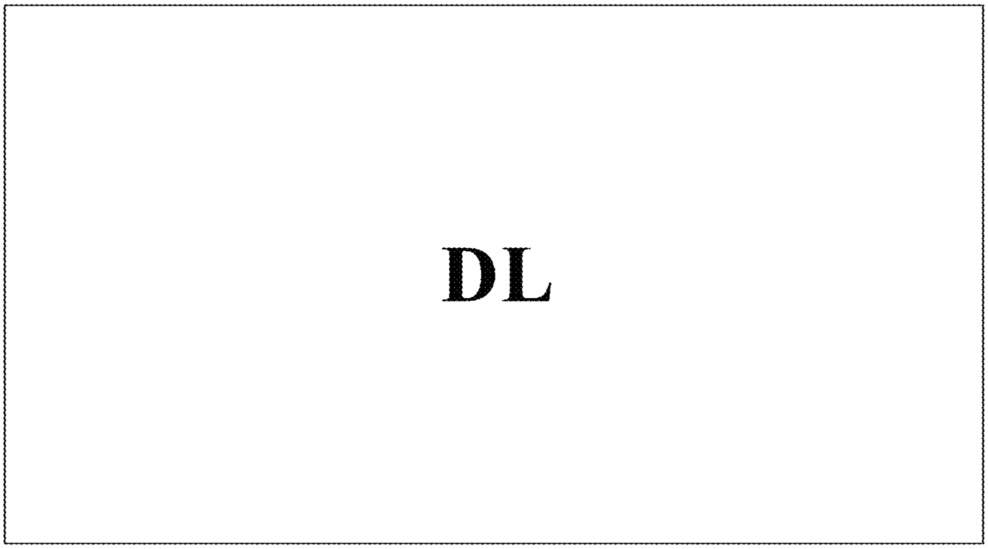
FIG. 6C illustrates the structure of a dielectric layer in an antenna depicted in FIG. 6A.
Figure 6D:
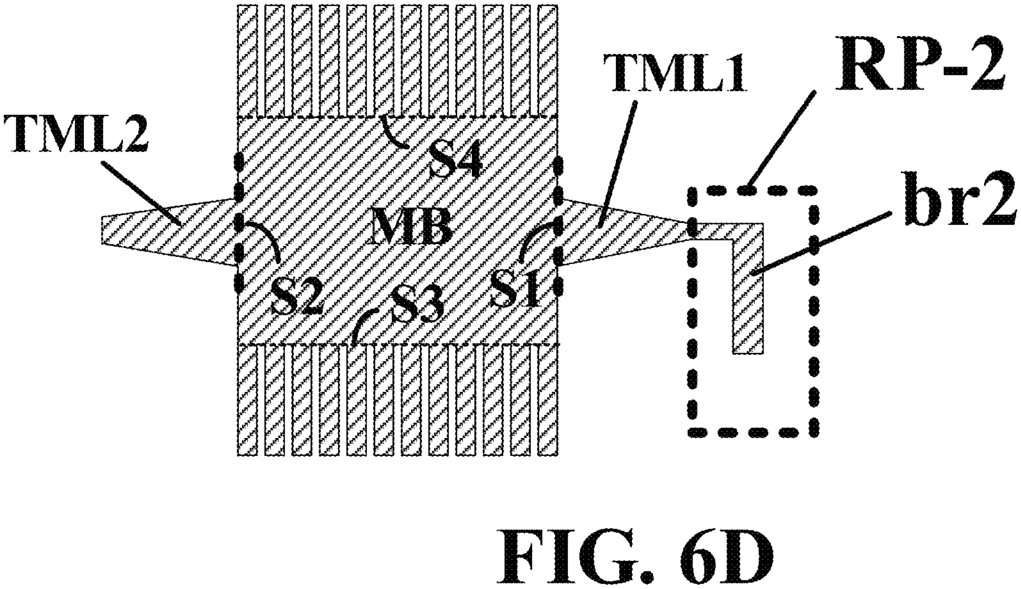
FIG. 6D illustrates the structure of a second conductive layer in an antenna depicted in FIG. 6A.

FIG. 6A is a plan view of an antenna in some embodiments according to the present disclosure. FIG. 6B illustrates the structure of a first conductive layer in an antenna depicted in FIG. 6A. FIG. 6C illustrates the structure of a dielectric layer in an antenna depicted in FIG. 6A. FIG. 6D illustrates the structure of a second conductive layer in an antenna depicted in FIG. 6A. Comparing the antenna in FIG. 6A with the antenna in FIG. 1A, the director in the antenna in FIG. 6A has a structure different from the director in the antenna in FIG. 1A.

In some embodiments, referring to FIG. 6A to FIG. 6D, the director DR includes a plurality of rods that are parallelly arranged and equispaced. Lengths of the plurality of rods gradually decrease along a direction away from the reflector RL, e.g., along the direction Dc in FIG. 2B. In one specific example, a total number of rods in the director DR is three, as shown in FIG. 6A. The director has a total of three rods arranged parallelly and equispaced. Lengths of the three rods are 3.0 mm, 2.5 mm, and 2.0 mm, and line widths of the three rods are 0.6 mm.

Other parameters of the antenna depicted in FIG. 6A that are not specifically discussed are the same or substantially the same as the corresponding parameters of the antenna depicted in FIG. 1A.

The inventors of the present disclosure, surprisingly and unexpectedly, discover that, by having the unique structure according to the present disclosure, an antenna with an ultra-wide bandwidth can be achieved.

Figure 7A:
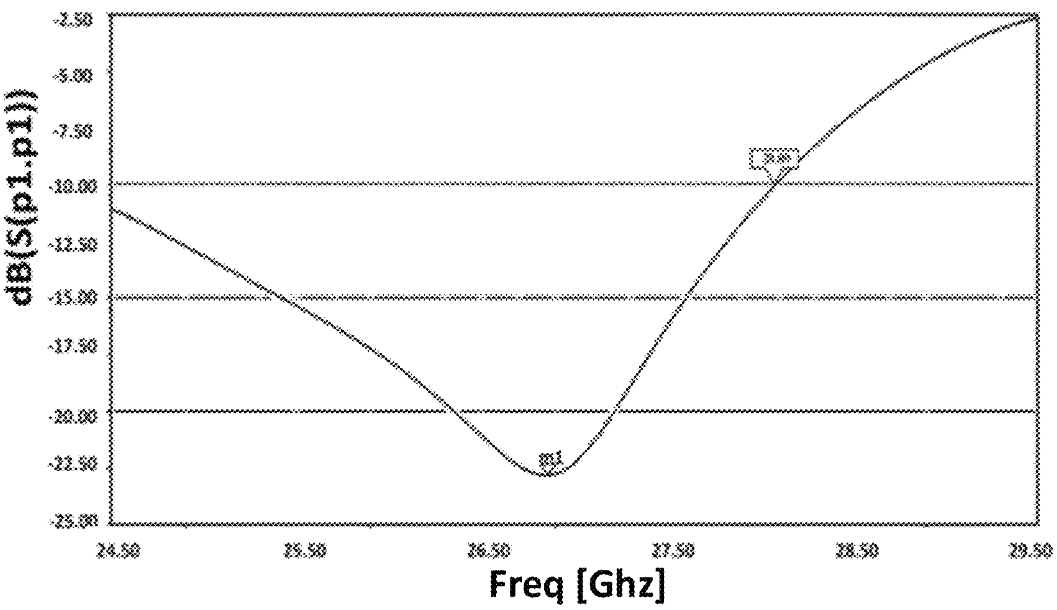
FIG. 7A illustrates an S11 graph of the antenna depicted in FIG. 6A.

In one specific example, the antenna has an overall thickness of $0.03\lambda_0$, wherein $\lambda_0$ stands for a wavelength in vacuum of a radiation produced by the antenna. FIG. 7A illustrates an S11 graph of the antenna depicted in FIG. 6A. Referring to FIG. 7A, the antenna has a resonant frequency at 26.8625 GHz, and a −10 dB impedance bandwidth ranging from 24.5 GHz to 28.09 GHz. The bandwidth of the antenna substantially covers 5G commercial millimeter bandwidth.

Figure 7B:
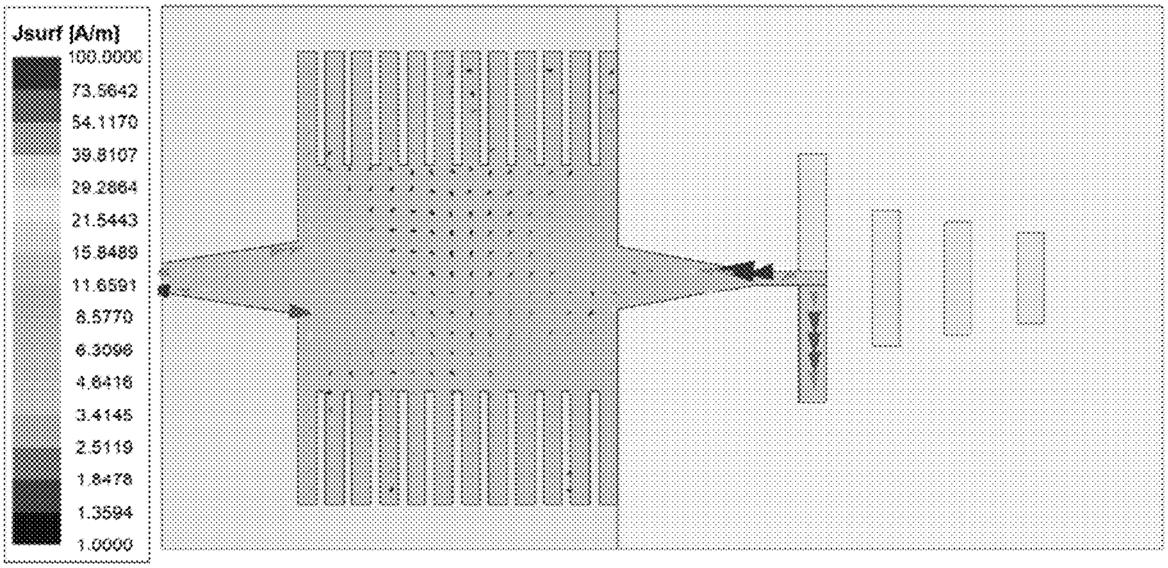
FIG. 7B illustrates current distribution in an antenna depicted in FIG. 6A.

FIG. 7B illustrates current distribution in an antenna depicted in FIG. 6A. Referring to FIG. 7B, the antenna has an increased current distribution along four sides of the main body and in the plurality of teeth of the transition structure as compared to a center of the main body where a very small current intensity is observed.

Figure 7C:
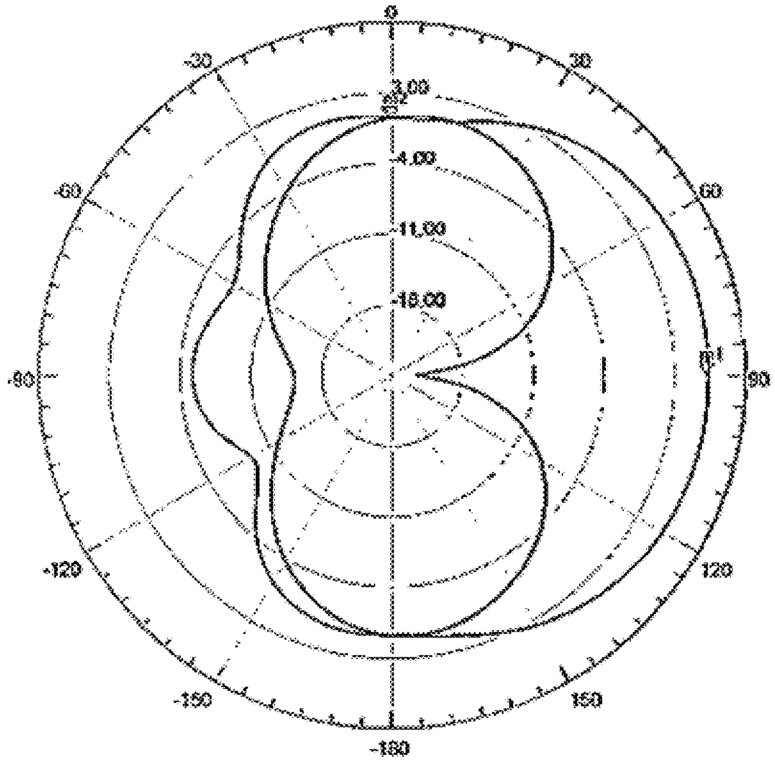
FIG. 7C illustrates an antenna radiation pattern in a E-plane and an H-plane of the antenna depicted in FIG. 6A at a resonant frequency point.
Figure 7D:
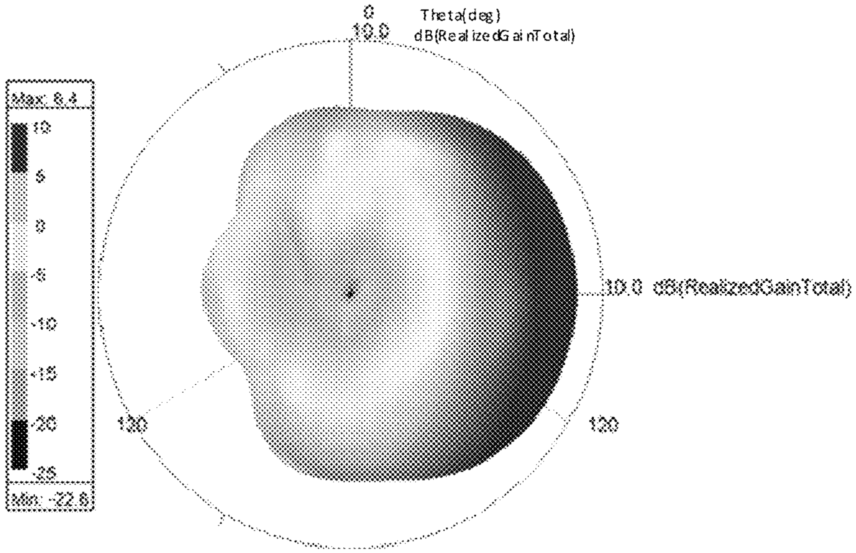
FIG. 7D illustrates a front view of an antenna radiation three-dimensional pattern of the antenna depicted in FIG. 6A at a resonant frequency point.

FIG. 7C illustrates an antenna radiation pattern in a E-plane and an H-plane of the antenna depicted in FIG. 6A at a resonant frequency point. FIG. 7D illustrates a front view of an antenna radiation three-dimensional pattern of the antenna depicted in FIG. 6A at a resonant frequency point. Referring to FIG. 7C and FIG. 7D, a maximum radiation is observed along a direction parallel to the antenna plane, and the radiation is a terminal-emitting radiation. The antenna has a sufficiently broad radiation beam along the direction of the maximum radiation, and having quasi-omnidirectional radiation characteristics, with a maximum radiation gain of 6.3 dBi. The antenna has a relatively low overall profile, a relatively high gain, and quasi-omnidirectional radiation characteristics. The present antenna can easily meet the requirements of wireless communication system designed for 5G millimeter wave band. As compared to the antenna depicted in FIG. 1A, the antenna depicted in FIG. 6A has an increased radiation beam width, and an improved quasi-omnidirectional radiation characteristics.

Figure 8A:
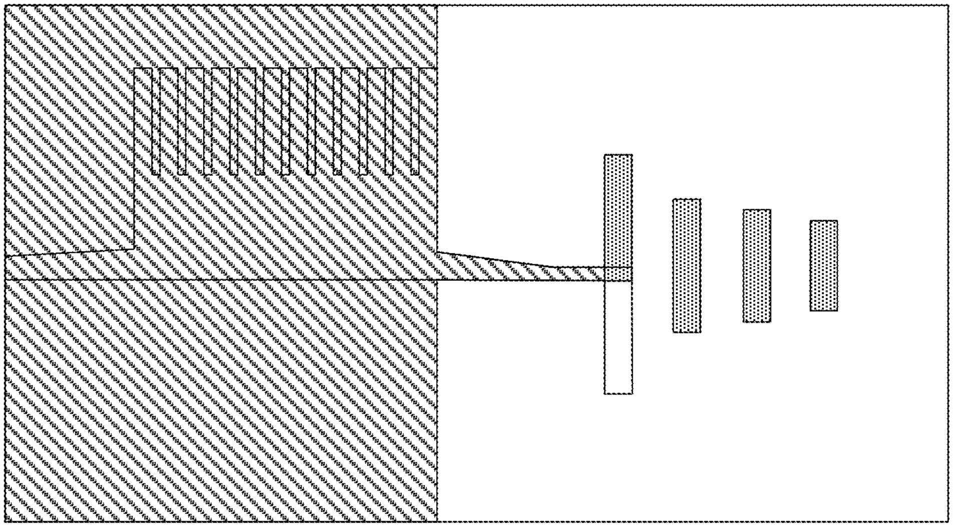
FIG. 8A is a plan view of an antenna in some embodiments according to the present disclosure.
Figure 8B:
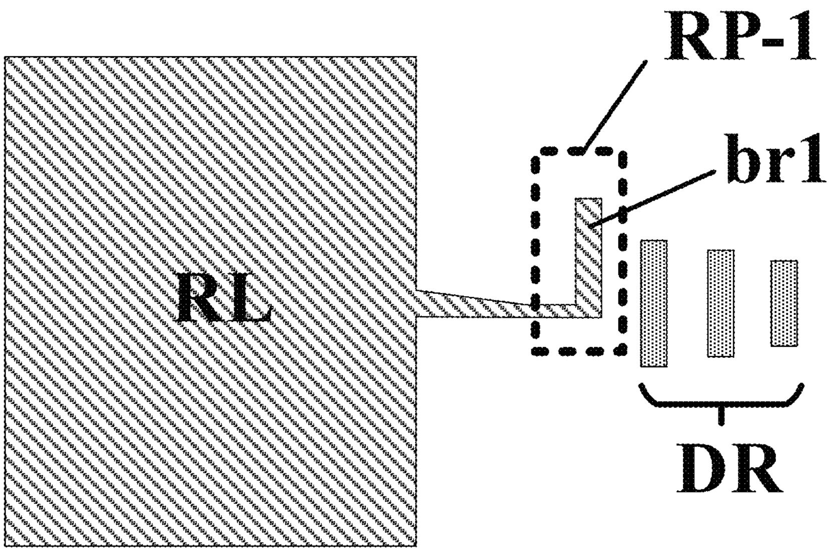
FIG. 8B illustrates the structure of a first conductive layer in an antenna depicted in FIG. 8A.
Figure 8C:
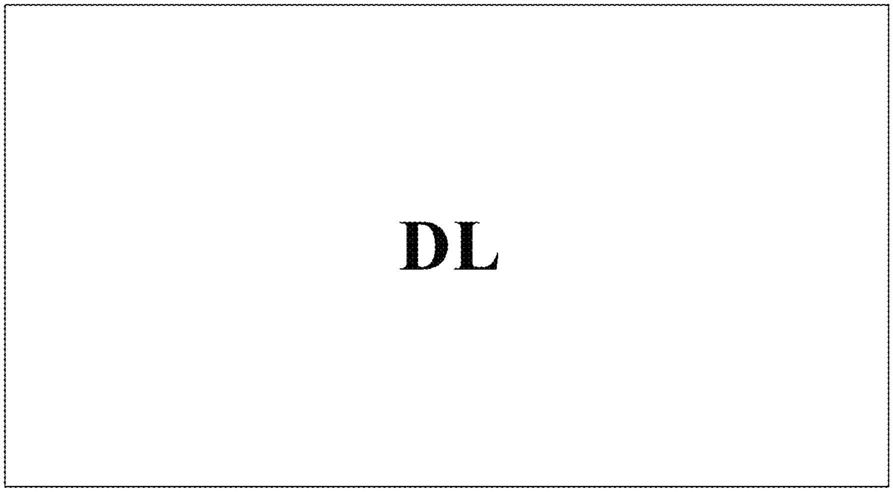
FIG. 8C illustrates the structure of a dielectric layer in an antenna depicted in FIG. 8A.
Figure 8D:
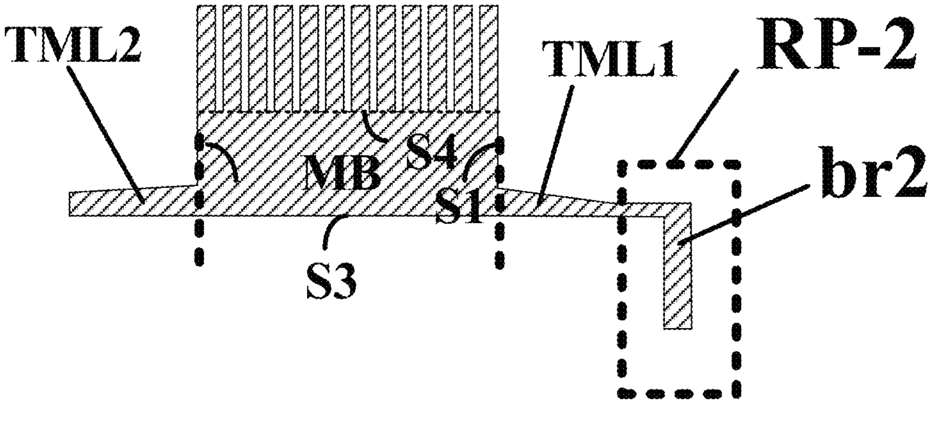
FIG. 8D illustrates the structure of a second conductive layer in an antenna depicted in FIG. 8A.

FIG. 8A is a plan view of an antenna in some embodiments according to the present disclosure. FIG. 8B illustrates the structure of a first conductive layer in an antenna depicted in FIG. 8A. FIG. 8C illustrates the structure of a dielectric layer in an antenna depicted in FIG. 8A. FIG. 8D illustrates the structure of a second conductive layer in an antenna depicted in FIG. 8A. Referring to FIG. 8A to FIG. 8D, the antenna in some embodiments includes a half-mode transition structure. Comparing the antenna in FIG. 8A with the antenna in FIG. 6A, the transition structure in the antenna in FIG. 8A is half of the transition structure in the antenna in FIG. 6A. The transition structure TS in the antenna depicted in FIG. 8A has parameters similar to the transition structure TS in the antenna depicted in FIG. 4A. The director DR in the antenna depicted in FIG. 8A has parameters similar to the director DR in the antenna depicted in FIG. 6A. Other parameters of the antenna depicted in FIG. 8A that are not specifically discussed are the same or substantially the same as the corresponding parameters of the antenna depicted in FIG. 1A, FIG. 4A, or FIG. 6A.

The inventors of the present disclosure, surprisingly and unexpectedly, discover that, by having the unique structure according to the present disclosure, an antenna with an ultra-wide bandwidth can be achieved.

Figure 9A:
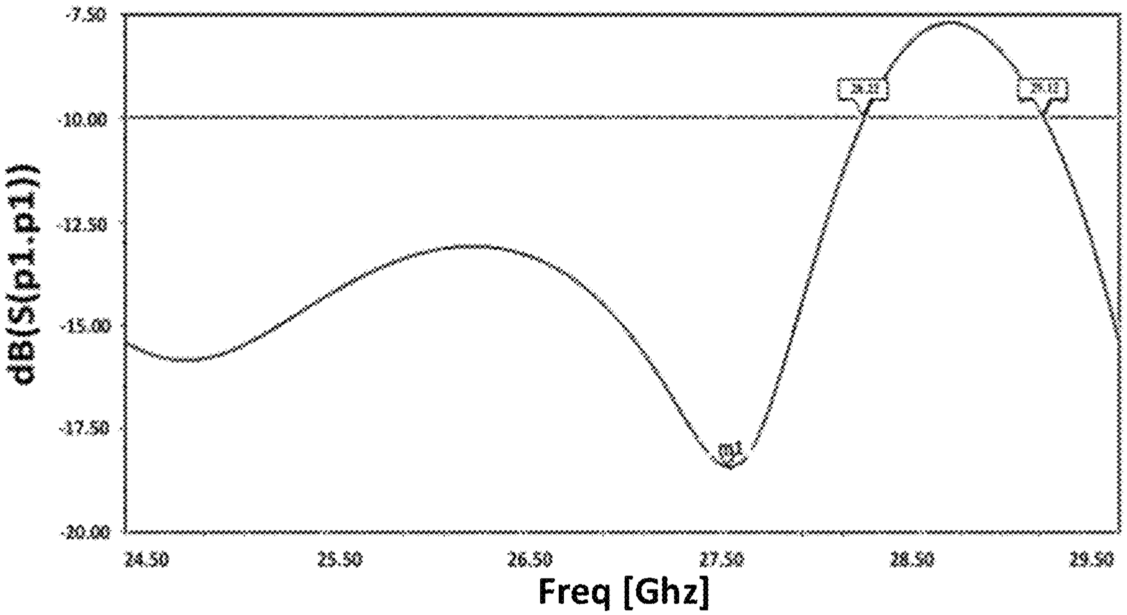
FIG. 9A illustrates an S11 graph of the antenna depicted in FIG. 8A.

In one specific example, the antenna has an overall thickness of $0.03\lambda_0$, wherein $\lambda_0$ stands for a wavelength in vacuum of a radiation produced by the antenna. FIG. 9A illustrates an S11 graph of the antenna depicted in FIG. 8A. Referring to FIG. 9A, the antenna has a resonant frequency at 27.5375 GHz, and a −10 dB impedance bandwidth ranging from 24.5 GHz to 28.22 GHZ. The bandwidth of the antenna substantially covers 5G commercial millimeter bandwidth.

Figure 9B:
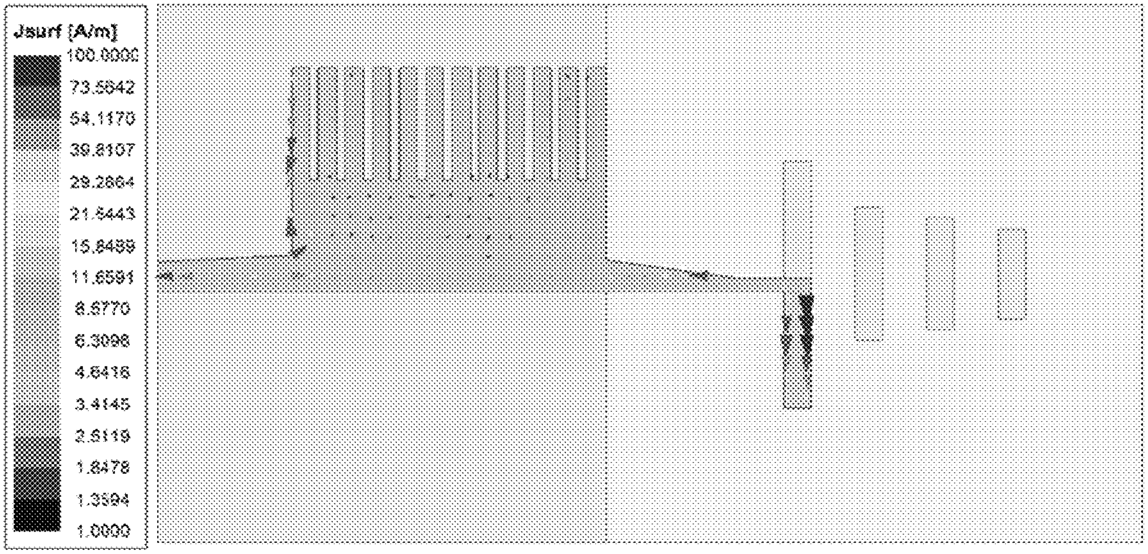
FIG. 9B illustrates current distribution in an antenna depicted in FIG. 8A.

FIG. 9B illustrates current distribution in an antenna depicted in FIG. 8A. Referring to FIG. 9B, the antenna has an increased current distribution along four sides of the main body and in the plurality of teeth of the transition structure as compared to a center of the main body where a very small current intensity is observed.

Figure 9C:
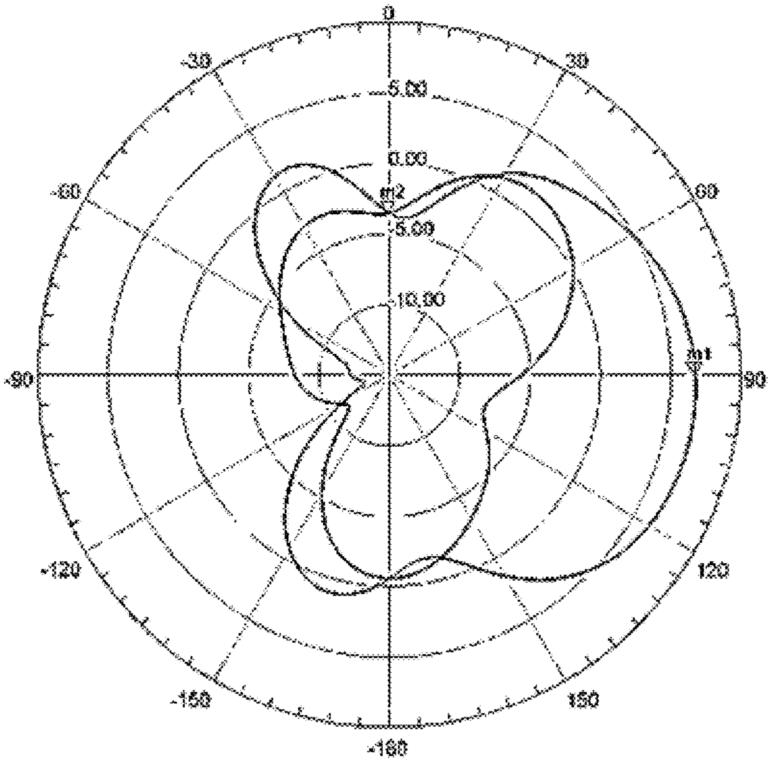
FIG. 9C illustrates an antenna radiation pattern in a E-plane and an H-plane of the antenna depicted in FIG. 8A at a resonant frequency point.
Figure 9D:
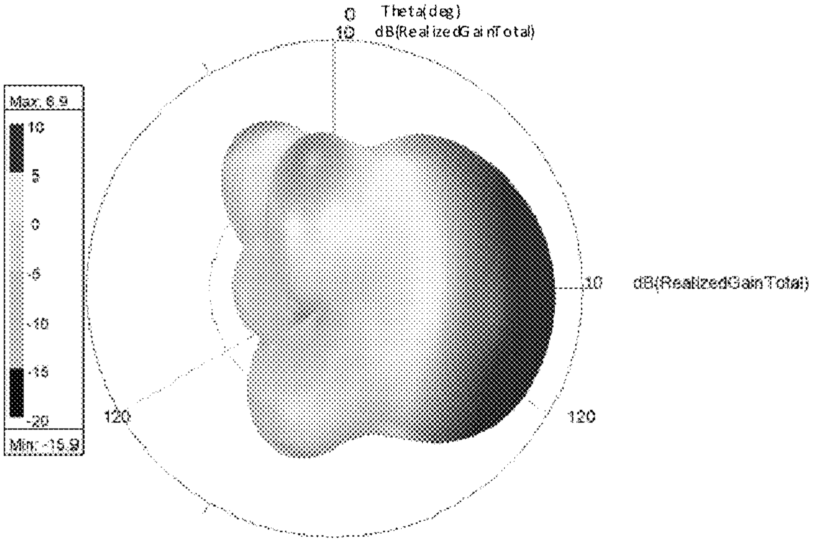
FIG. 9D illustrates a front view of an antenna radiation three-dimensional pattern of the antenna depicted in FIG. 8A at a resonant frequency point.

FIG. 9C illustrates an antenna radiation pattern in a E-plane and an H-plane of the antenna depicted in FIG. 8A at a resonant frequency point. FIG. 9D illustrates a front view of an antenna radiation three-dimensional pattern of the antenna depicted in FIG. 8A at a resonant frequency point. Referring to FIG. 9C and FIG. 9D, a maximum radiation is observed along a direction parallel to the antenna plane, and the radiation is a terminal-emitting radiation. The antenna has a sufficiently broad radiation beam along the direction of the maximum radiation, and having quasi-omnidirectional radiation characteristics, with a maximum radiation gain of 6.75 dBi. The antenna has a relatively low overall profile, a relatively high gain, and quasi-omnidirectional radiation characteristics. The present antenna can easily meet the requirements of wireless communication system designed for 5G millimeter wave band. The antenna depicted in FIG. 8A has a decreased radiation beam width as compared to the antenna depicted in FIG. 6A, but an increased radiation beam width as compared to the antenna depicted in FIG. 4A. The quasi-omnidirectional radiation characteristics of the antenna depicted in FIG. 8A is better than the quasi-omnidirectional radiation characteristics as compared to the antenna depicted in FIG. 4A, but not as good as the quasi-omnidirectional radiation characteristics of the antenna depicted in FIG. 6A. Thus, for antennas having a half-mode transition structure, the structure and arrangement of director DR has a bigger impact on its characteristics.

Figure 10A:
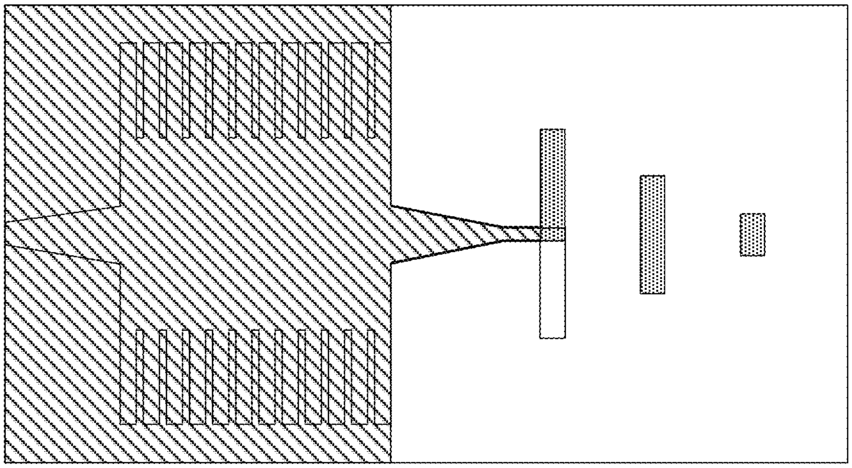
FIG. 10A is a plan view of an antenna in some embodiments according to the present disclosure.
Figure 10B:
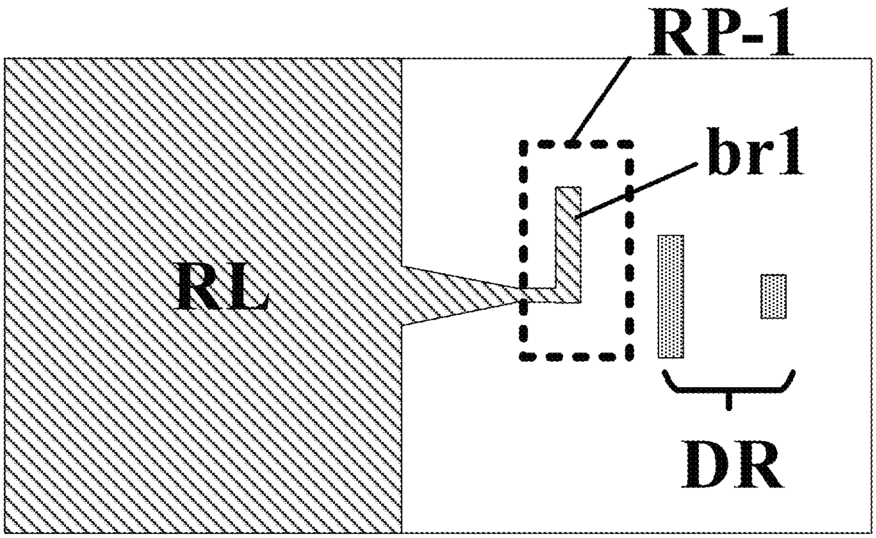
FIG. 10B illustrates the structure of a first conductive layer in an antenna depicted in FIG. 10A.
Figure 10C:
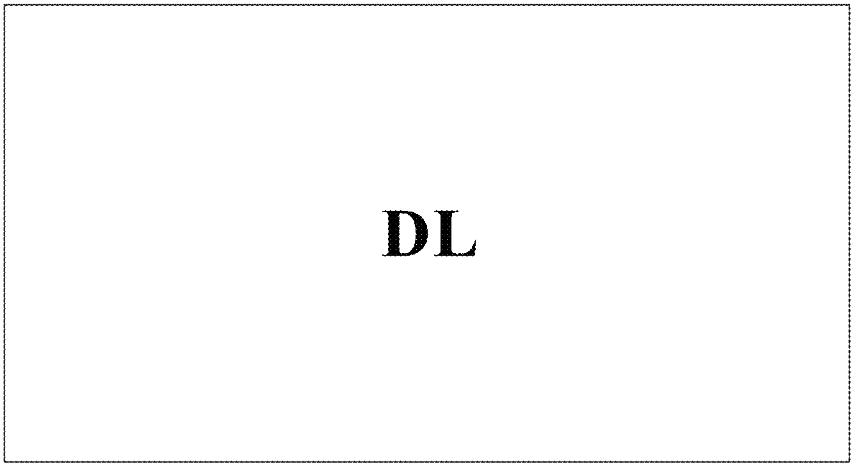
FIG. 10C illustrates the structure of a dielectric layer in an antenna depicted in FIG. 10A.
Figure 10D:
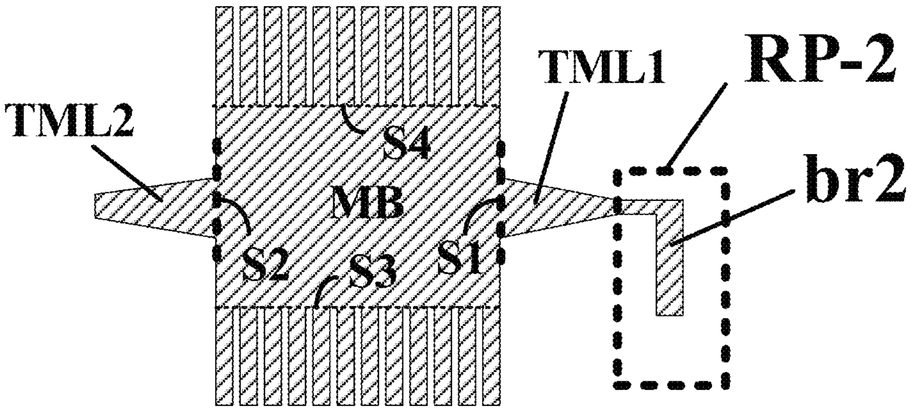
FIG. 10D illustrates the structure of a second conductive layer in an antenna depicted in FIG. 10A.

FIG. 10A is a plan view of an antenna in some embodiments according to the present disclosure. FIG. 10B illustrates the structure of a first conductive layer in an antenna depicted in FIG. 10A. FIG. 10C illustrates the structure of a dielectric layer in an antenna depicted in FIG. 10A. FIG. 10D illustrates the structure of a second conductive layer in an antenna depicted in FIG. 10A. Comparing the antenna in FIG. 10A with the antenna in FIG. 1A or FIG. 6A, the director in the antenna in FIG. 10A has a structure different from the directors in the antenna in FIG. 1A or FIG. 6A.

In some embodiments, referring to FIG. 10A to FIG. 10D, the director DR includes a plurality of rods that are parallelly arranged and equispaced. Lengths of the plurality of rods gradually decrease along a direction away from the reflector RL, e.g., along the direction Dc in FIG. 2B. In one specific example, a total number of rods in the director DR is two, as shown in FIG. 10A. The director has a total of two rods arranged parallelly and equispaced. Lengths of the two rods are 3.0 mm and 1.0 mm, and line widths of the two rods are 0.6 mm.

Other parameters of the antenna depicted in FIG. 10A that are not specifically discussed are the same or substantially the same as the corresponding parameters of the antenna depicted in FIG. 1A or FIG. 6A.

The inventors of the present disclosure, surprisingly and unexpectedly, discover that, by having the unique structure according to the present disclosure, an antenna with an ultra-wide bandwidth can be achieved.

Figure 11A:
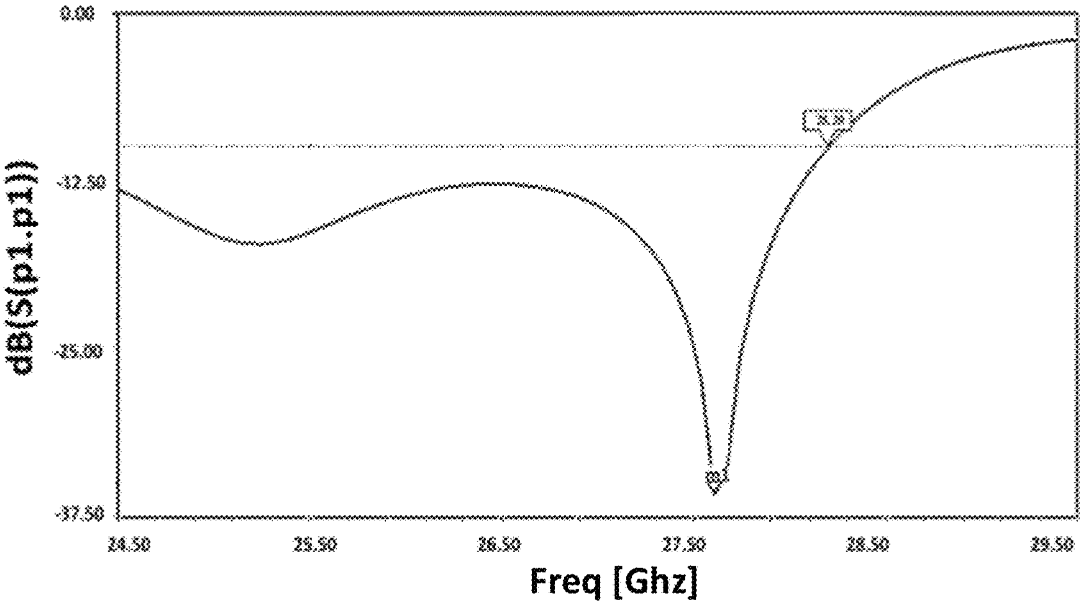
FIG. 11A illustrates an S11 graph of the antenna depicted in FIG. 10A.

In one specific example, the antenna has an overall thickness of $0.03\lambda_0$, wherein $\lambda_0$ stands for a wavelength in vacuum of a radiation produced by the antenna. FIG. 11A illustrates an S11 graph of the antenna depicted in FIG. 10A. Referring to FIG. 11A, the antenna has a resonant frequency at 27.605 GHZ, and a −10 dB impedance bandwidth ranging from 24.5 GHZ to 28.2 GHZ. The bandwidth of the antenna substantially covers 5G commercial millimeter bandwidth.

Figure 11B:
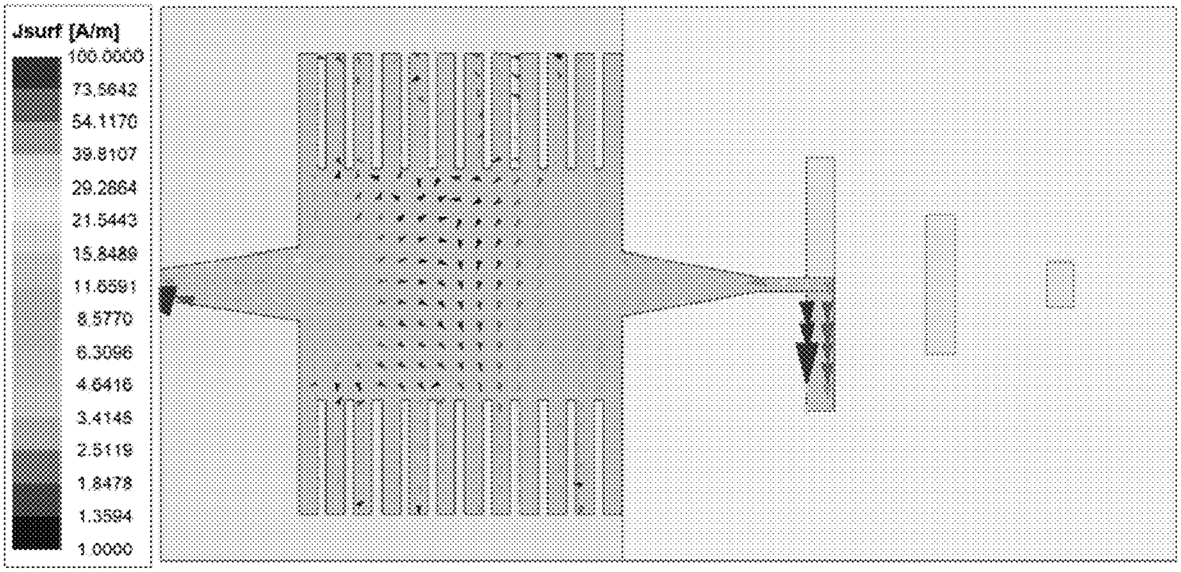
FIG. 11B illustrates current distribution in an antenna depicted in FIG. 10A.

FIG. 11B illustrates current distribution in an antenna depicted in FIG. 10A. Referring to FIG. 11B, the antenna has an increased current distribution along four sides of the main body and in the plurality of teeth of the transition structure as compared to a center of the main body where a very small current intensity is observed.

Figure 11C:
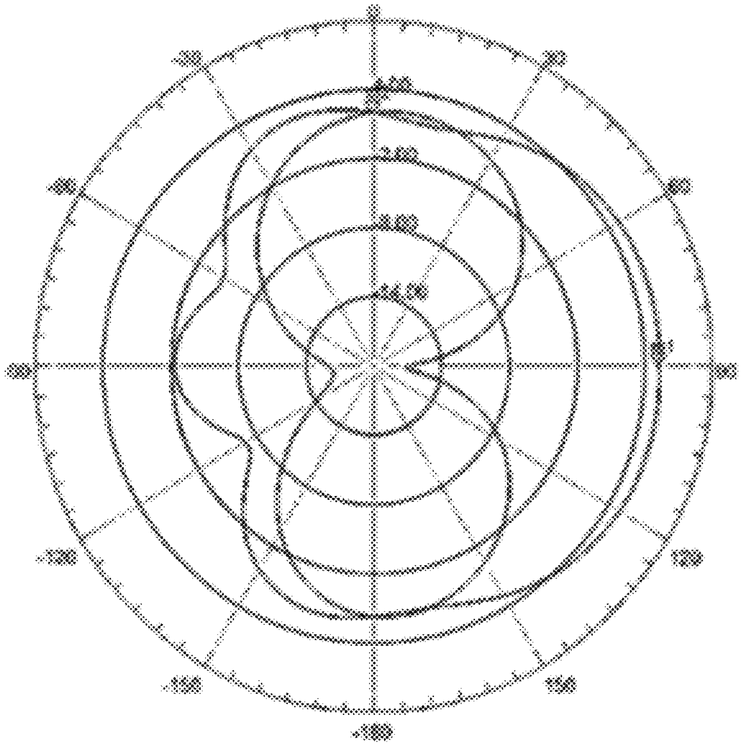
FIG. 11C illustrates an antenna radiation pattern in a E-plane and an H-plane of the antenna depicted in FIG. 10A at a resonant frequency point.
Figure 11D:
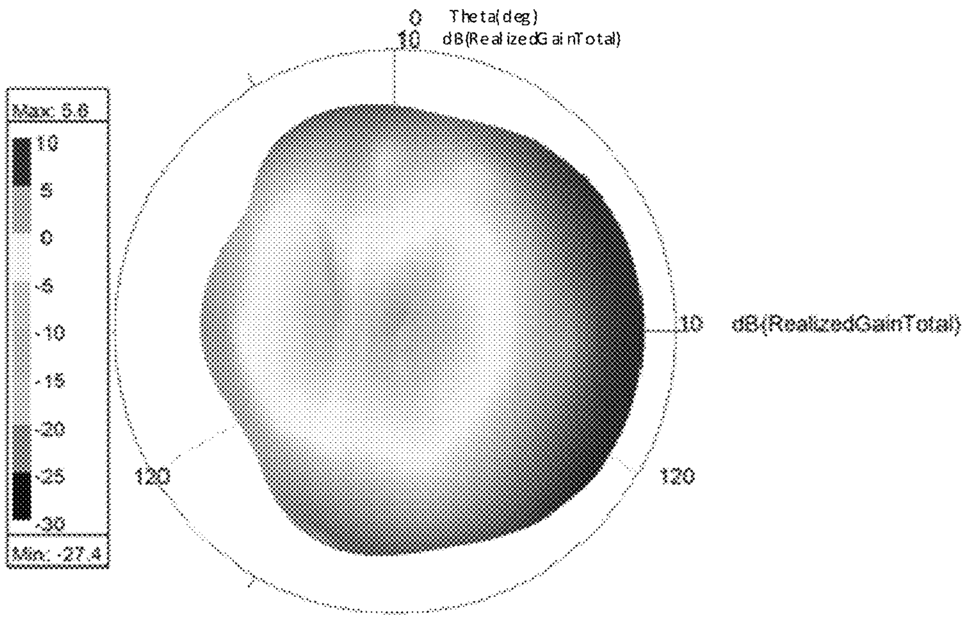
FIG. 11D illustrates a front view of an antenna radiation three-dimensional pattern of the antenna depicted in FIG. 10A at a resonant frequency point.

FIG. 11C illustrates an antenna radiation pattern in a E-plane and an H-plane of the antenna depicted in FIG. 10A at a resonant frequency point. FIG. 11D illustrates a front view of an antenna radiation three-dimensional pattern of the antenna depicted in FIG. 10A at a resonant frequency point. Referring to FIG. 11C and FIG. 11D, a maximum radiation is observed along a direction parallel to the antenna plane, and the radiation is a terminal-emitting radiation. The antenna has a sufficiently broad radiation beam along the direction of the maximum radiation, and having quasi-omnidirectional radiation characteristics, with a maximum radiation gain of 5.35 dBi. The antenna has a relatively low overall profile, a relatively high gain, and quasi-omnidirectional radiation characteristics. The present antenna can easily meet the requirements of wireless communication system designed for 5G millimeter wave band. As compared to the antenna depicted in FIG. 1A, the radiation beam width and quasi-omnidirectional radiation characteristics of the antenna depicted in FIG. 10A remain substantially the same. As compared to the antenna depicted in FIG. 1A, the antenna depicted in FIG. 10A has a decreased radiation gain, reflecting the impact of the specific structure of the director (e.g., lengths of the rods) on the performance of the antenna.

Figure 12A:
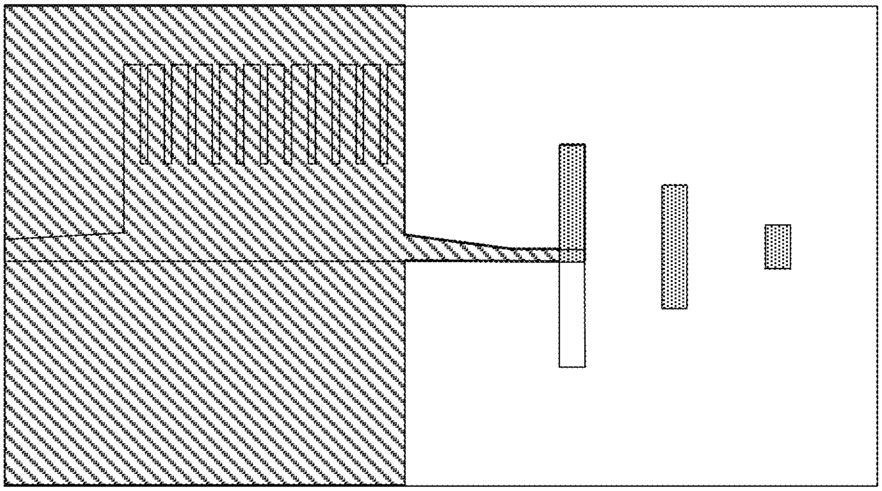
FIG. 12A is a plan view of an antenna in some embodiments according to the present disclosure.
Figure 12B:
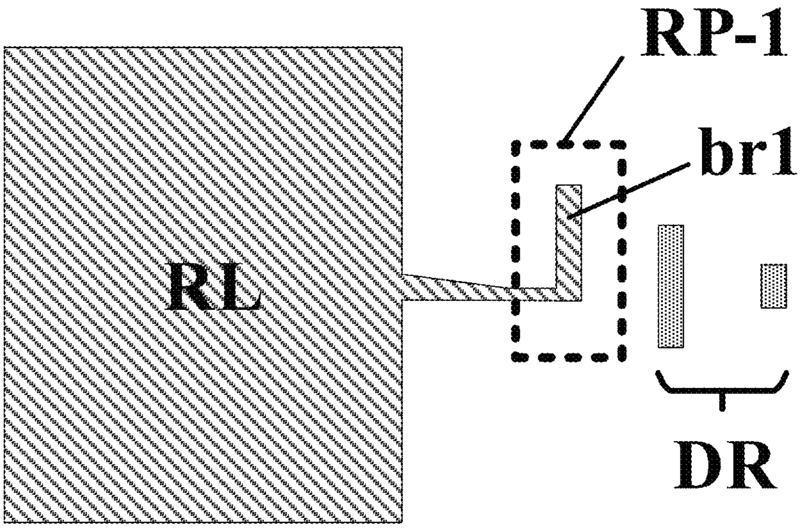
FIG. 12B illustrates the structure of a first conductive layer in an antenna depicted in FIG. 12A.
Figure 12C:
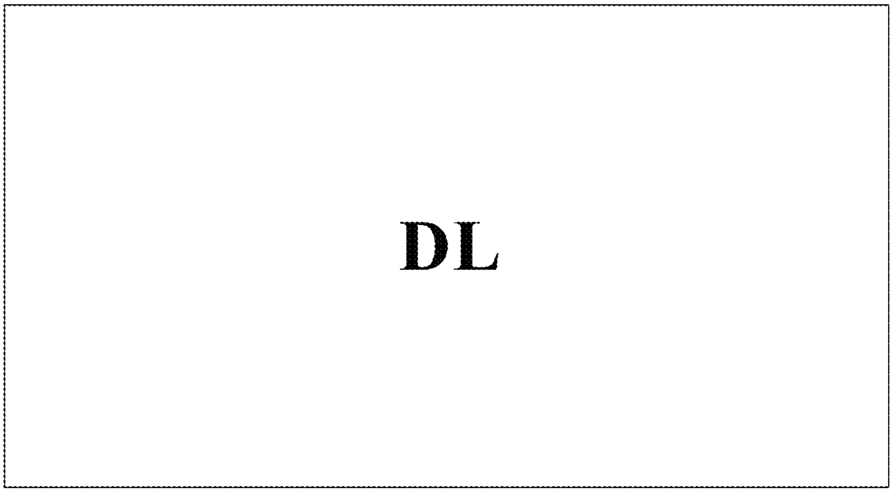
FIG. 12C illustrates the structure of a dielectric layer in an antenna depicted in FIG. 12A.
Figure 12D:
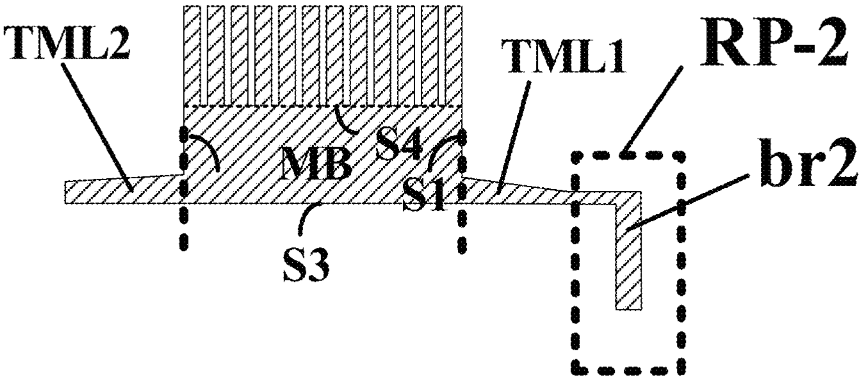
FIG. 12D illustrates the structure of a second conductive layer in an antenna depicted in FIG. 12A.

FIG. 12A is a plan view of an antenna in some embodiments according to the present disclosure. FIG. 12B illustrates the structure of a first conductive layer in an antenna depicted in FIG. 12A. FIG. 12C illustrates the structure of a dielectric layer in an antenna depicted in FIG. 12A. FIG. 12D illustrates the structure of a second conductive layer in an antenna depicted in FIG. 12A. Referring to FIG. 12A to FIG. 12D, the antenna in some embodiments includes a half-mode transition structure. Comparing the antenna in FIG. 12A with the antenna in FIG. 10A, the transition structure in the antenna in FIG. 12A is half of the transition structure in the antenna in FIG. 10A. The transition structure TS in the antenna depicted in FIG. 12A has parameters similar to the transition structure TS in the antenna depicted in FIG. 4A. The director DR in the antenna depicted in FIG. 12A has parameters similar to the director DR in the antenna depicted in FIG. 10A. Other parameters of the antenna depicted in FIG. 12A that are not specifically discussed are the same or substantially the same as the corresponding parameters of the antenna depicted in FIG. 1A, FIG. 4A, or FIG. 10A.

The inventors of the present disclosure, surprisingly and unexpectedly, discover that, by having the unique structure according to the present disclosure, an antenna with an ultra-wide bandwidth can be achieved.

Figure 13A:
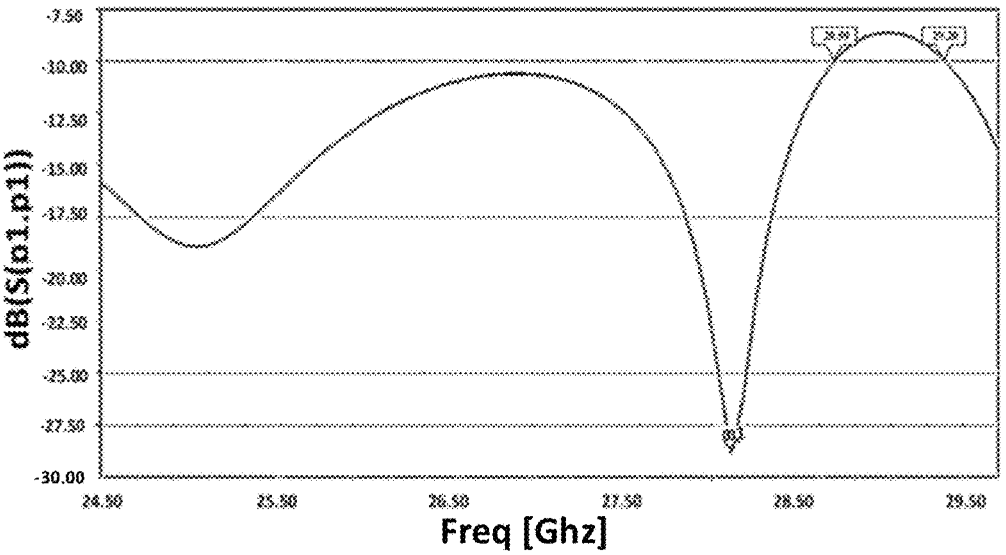
FIG. 13A illustrates an S11 graph of the antenna depicted in FIG. 12A.

In one specific example, the antenna has an overall thickness of $0.03\lambda_0$, wherein $\lambda_0$ stands for a wavelength in vacuum of a radiation produced by the antenna. The transition structure TS has a length of 7 mm and a width of 5 mm. A total number of teeth on the third side S3 is 12. A respective tooth has a length of 2.5 mm and a width of 0.4 mm. A respective slit has a width of 0.2 mm. The director DR has a total of two rods arranged parallelly and equispaced. Lengths of the two rods are 3.0 mm and 1.0 mm, and line widths of the two rods are 0.6 mm. FIG. 13A illustrates an S11 graph of the antenna depicted in FIG. 12A. Referring to FIG. 13A, the antenna has a resonant frequency at 28.01 GHZ, and a −10 dB impedance bandwidth ranging from 24.5 GHZ to 28.59 GHZ. The bandwidth of the antenna substantially covers 5G commercial millimeter bandwidth.

Figure 13B:
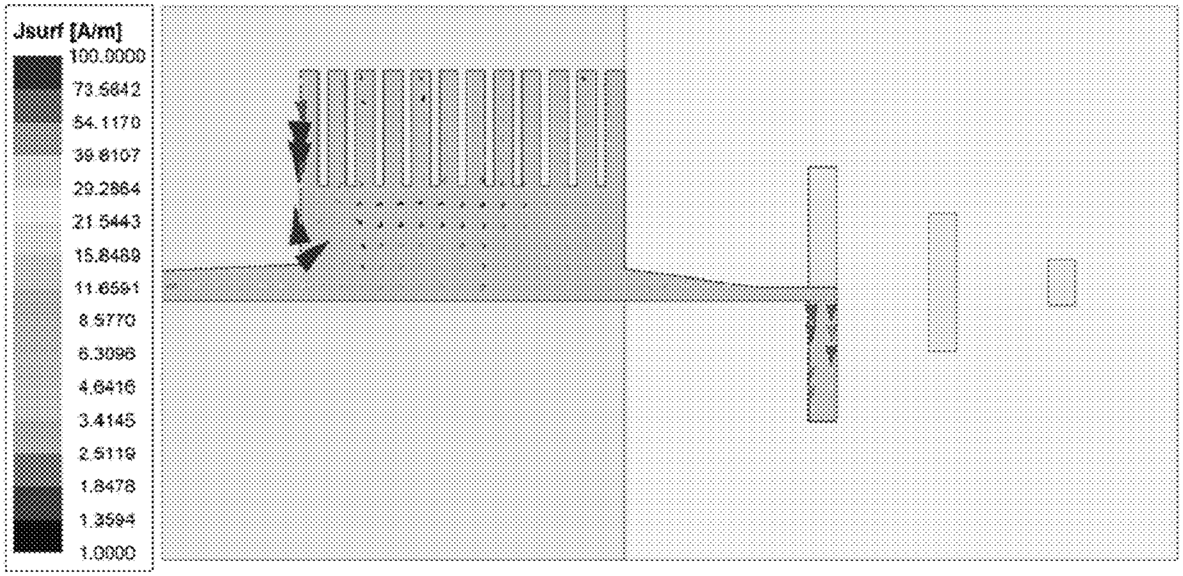
FIG. 13B illustrates current distribution in an antenna depicted in FIG. 12A.

FIG. 13B illustrates current distribution in an antenna depicted in FIG. 12A. Referring to FIG. 13B, the antenna has an increased current distribution along four sides of the main body and in the plurality of teeth of the transition structure as compared to a center of the main body where a very small current intensity is observed.

Figure 13C:
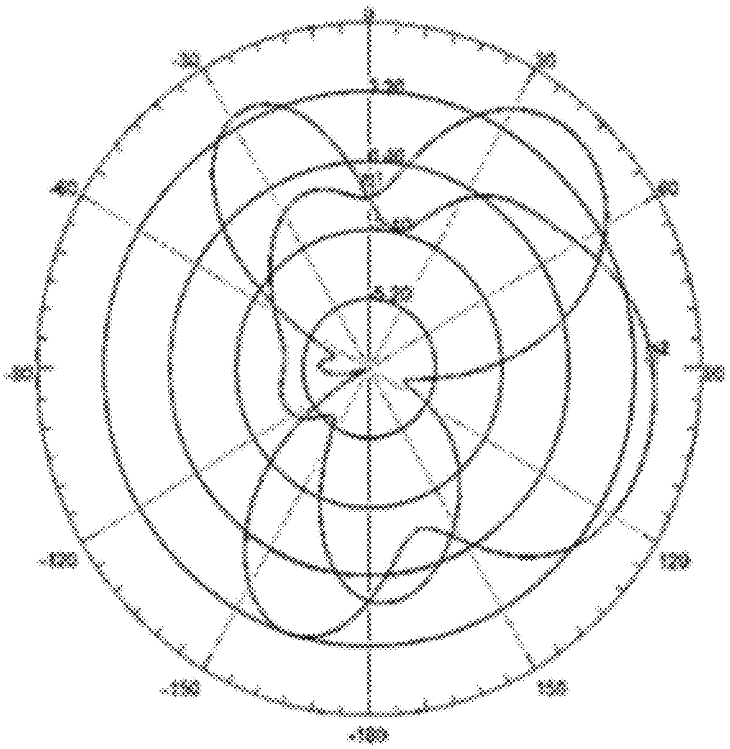
FIG. 13C illustrates an antenna radiation pattern in a E-plane and an H-plane of the antenna depicted in FIG. 12A at a resonant frequency point.
Figure 13D:
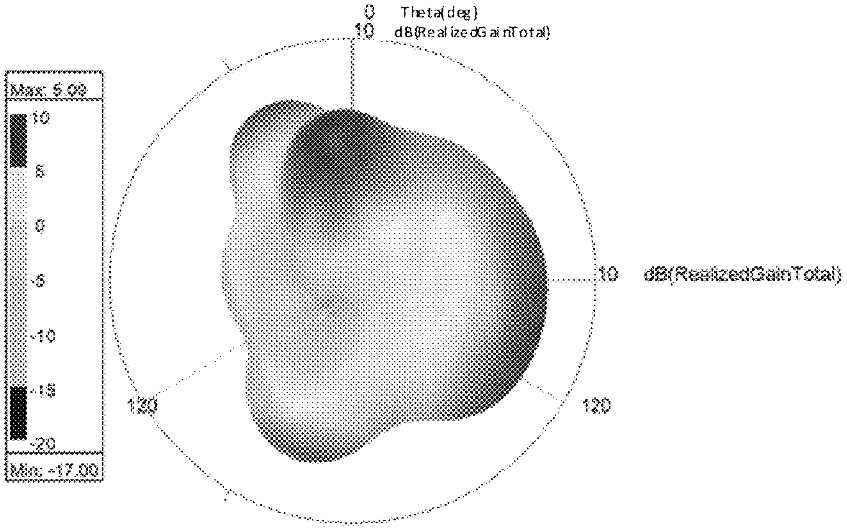
FIG. 13D illustrates a front view of an antenna radiation three-dimensional pattern of the antenna depicted in FIG. 12A at a resonant frequency point.

FIG. 13C illustrates an antenna radiation pattern in a E-plane and an H-plane of the antenna depicted in FIG. 12A at a resonant frequency point. FIG. 13D illustrates a front view of an antenna radiation three-dimensional pattern of the antenna depicted in FIG. 12A at a resonant frequency point. Referring to FIG. 13C and FIG. 13D, a maximum radiation is observed along a direction parallel to the antenna plane, and the radiation is a terminal-emitting radiation. The antenna has a sufficiently broad radiation beam along the direction of the maximum radiation, and having quasi-omnidirectional radiation characteristics, with a maximum radiation gain of 3.97 dBi. The antenna has a relatively low overall profile, a relatively high gain, and quasi-omnidirectional radiation characteristics. The present antenna can easily meet the requirements of wireless communication system designed for 5G millimeter wave band. The antenna depicted in FIG. 12A has a decreased radiation beam width as compared to the antenna depicted in FIG. 10A. The quasi-omnidirectional radiation characteristics of the antenna depicted in FIG. 12A is not as good as the quasi-omnidirectional radiation characteristics of the antenna depicted in FIG. 10A, reflecting the impact of the specific structure of the director (e.g., number and lengths of the rods) on the performance of the antenna.

Figure 14A:
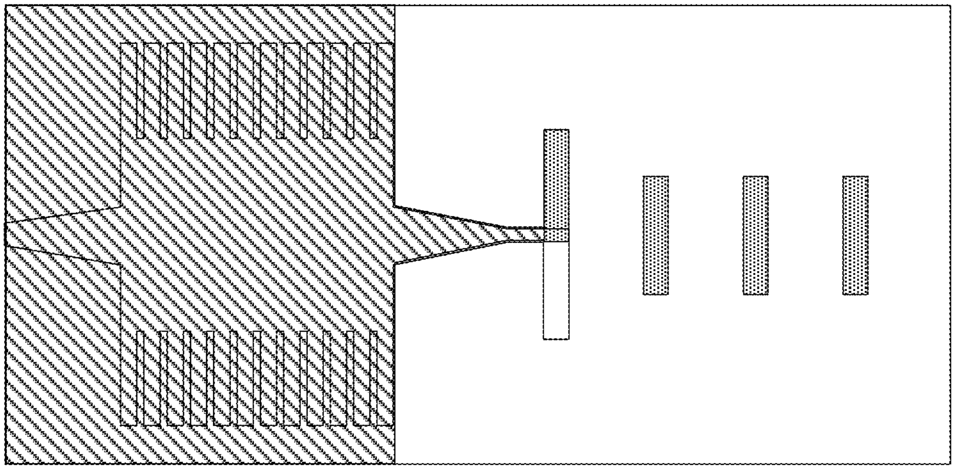
FIG. 14A is a plan view of an antenna in some embodiments according to the present disclosure.
Figure 14B:
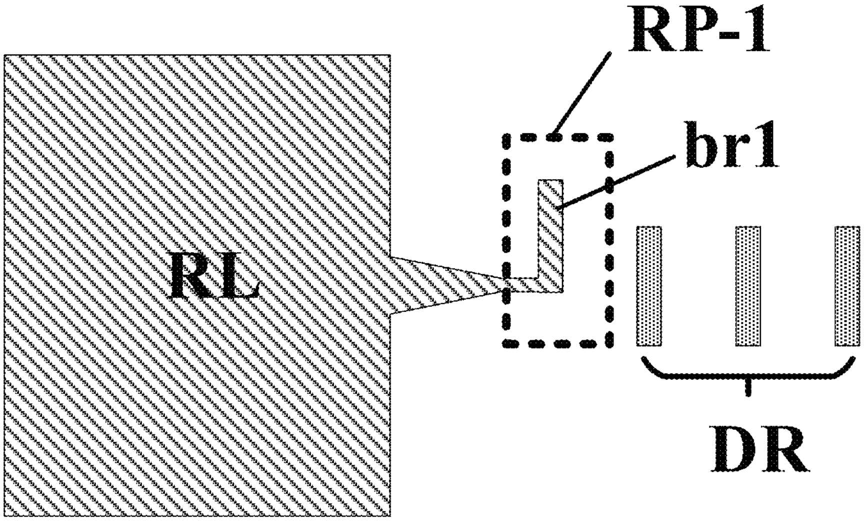
FIG. 14B illustrates the structure of a first conductive layer in an antenna depicted in FIG. 14A.
Figure 14C:
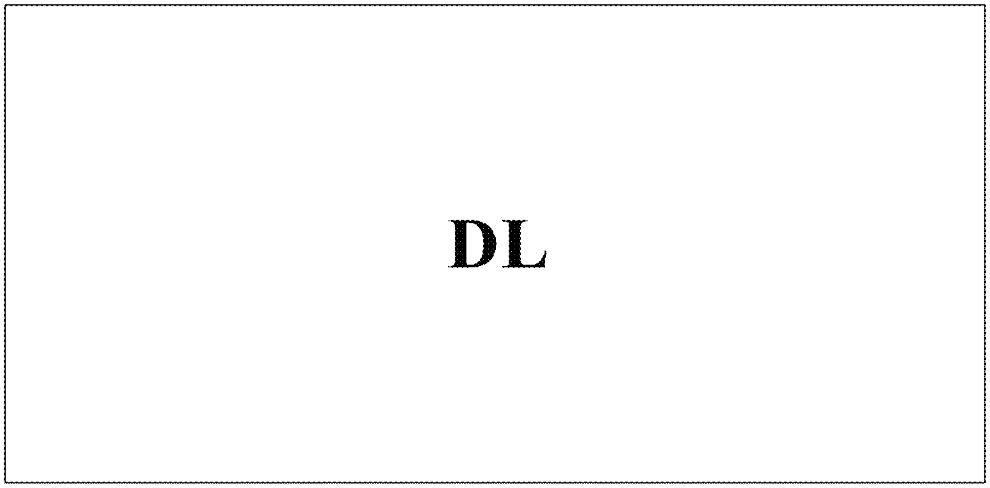
FIG. 14C illustrates the structure of a dielectric layer in an antenna depicted in FIG. 14A.
Figure 14D:
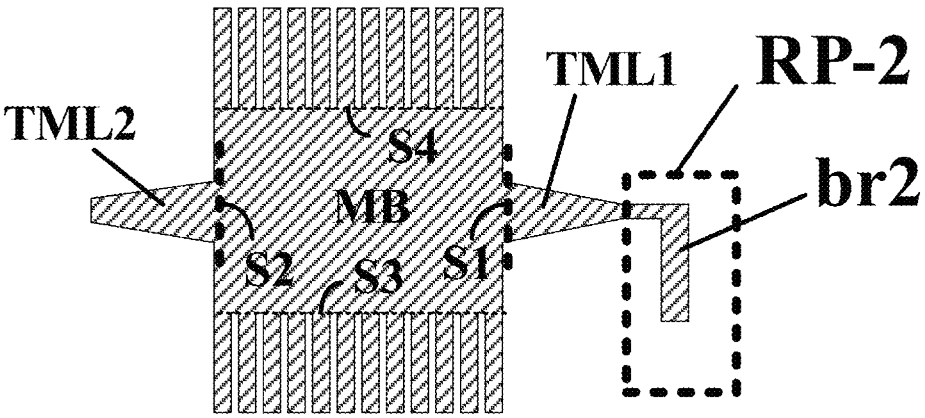
FIG. 14D illustrates the structure of a second conductive layer in an antenna depicted in FIG. 14A.

FIG. 14A is a plan view of an antenna in some embodiments according to the present disclosure. FIG. 14B illustrates the structure of a first conductive layer in an antenna depicted in FIG. 14A. FIG. 14C illustrates the structure of a dielectric layer in an antenna depicted in FIG. 14A. FIG. 14D illustrates the structure of a second conductive layer in an antenna depicted in FIG. 14A. Comparing the antenna in FIG. 14A with the antenna in FIG. 1A, a total number of rods in the director in the antenna in FIG. 14A is different from a total number of rods in the director in the antenna in FIG. 1A.

In some embodiments, referring to FIG. 14A to FIG. 14D, the director DR includes a plurality of rods that are parallelly arranged and equispaced. A total number of rods in the director DR is three. The three rods have a same length, e.g., 3.0 mm, and a same line width, e.g., 0.6 mm. The three rods are spaced apart from each other by 2.0 mm.

Other parameters of the antenna depicted in FIG. 14A that are not specifically discussed are the same or substantially the same as the corresponding parameters of the antenna depicted in FIG. 1A.

The inventors of the present disclosure, surprisingly and unexpectedly, discover that, by having the unique structure according to the present disclosure, an antenna with an ultra-wide bandwidth can be achieved.

Figure 15A:
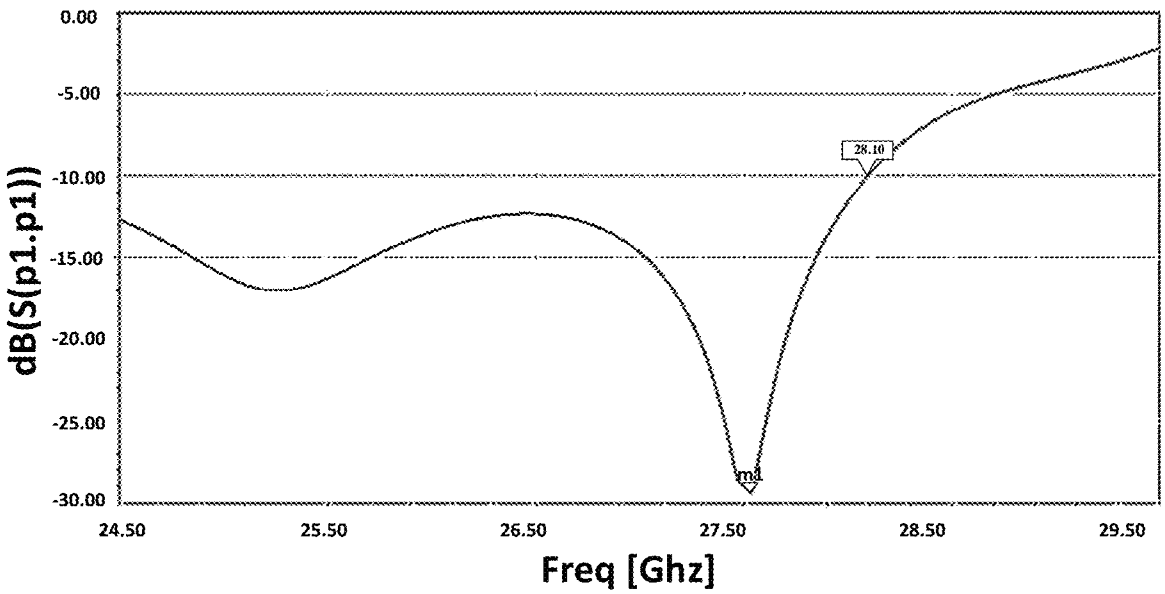
FIG. 15A illustrates an S11 graph of the antenna depicted in FIG. 14A.

In one specific example, the antenna has an overall thickness of $0.03\lambda_0$, wherein $\lambda_0$ stands for a wavelength in vacuum of a radiation produced by the antenna. FIG. 15A illustrates an S11 graph of the antenna depicted in FIG. 14A. Referring to FIG. 15A, the antenna has a resonant frequency at 27.5375 GHZ, and a −10 dB impedance bandwidth ranging from 24.5 GHz to 28.10 GHz. The bandwidth of the antenna substantially covers 5G commercial millimeter bandwidth.

Figure 15B:
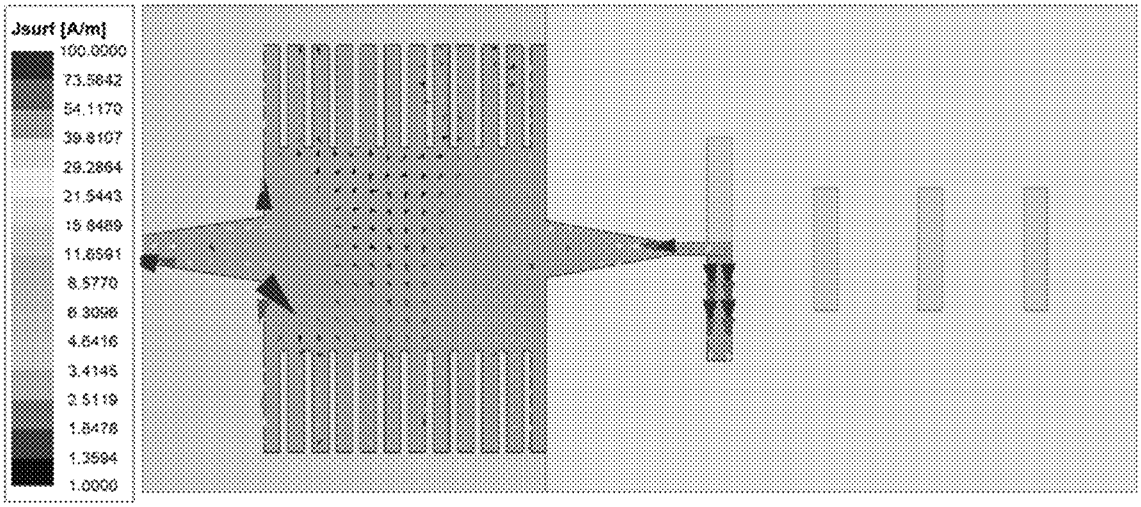
FIG. 15B illustrates current distribution in an antenna depicted in FIG. 14A.

FIG. 15B illustrates current distribution in an antenna depicted in FIG. 14A. Referring to FIG. 15B, the antenna has an increased current distribution along four sides of the main body and in the plurality of teeth of the transition structure as compared to a center of the main body where a very small current intensity is observed.

Figure 15C:
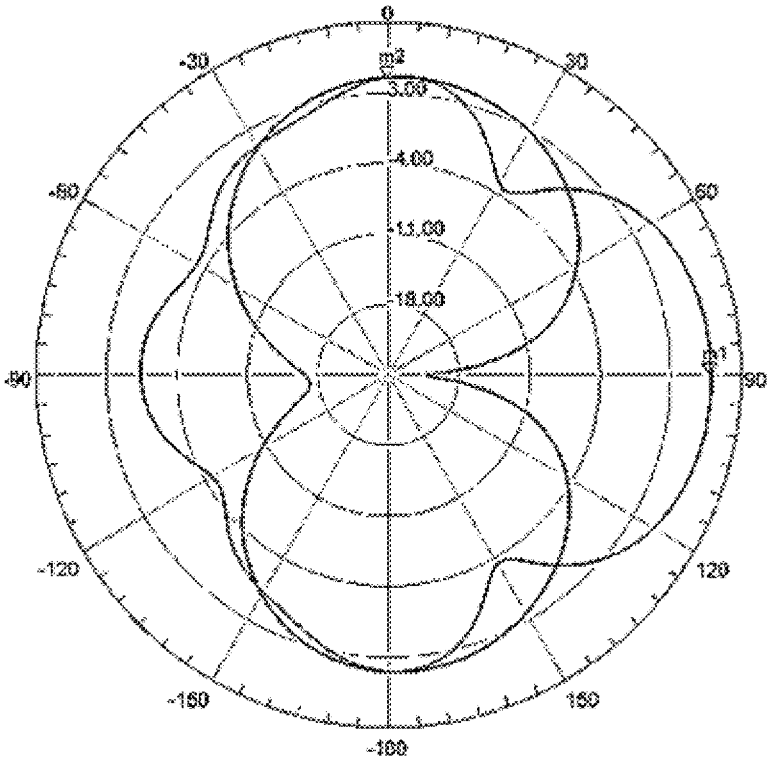
FIG. 15C illustrates an antenna radiation pattern in a E-plane and an H-plane of the antenna depicted in FIG. 14A at a resonant frequency point.
Figure 15D:
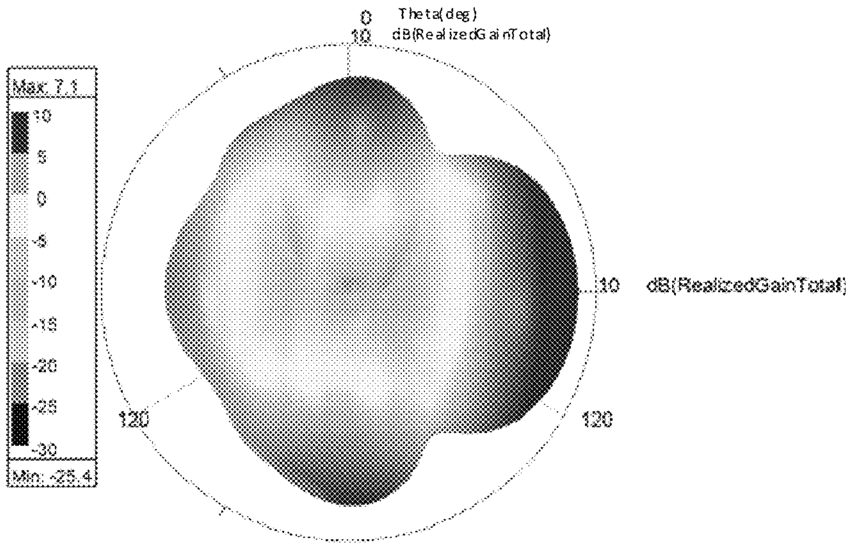
FIG. 15D illustrates a front view of an antenna radiation three-dimensional pattern of the antenna depicted in FIG. 14A at a resonant frequency point.

FIG. 15C illustrates an antenna radiation pattern in a E-plane and an H-plane of the antenna depicted in FIG. 14A at a resonant frequency point. FIG. 15D illustrates a front view of an antenna radiation three-dimensional pattern of the antenna depicted in FIG. 14A at a resonant frequency point. Referring to FIG. 15C and FIG. 15D, a maximum radiation is observed along a direction parallel to the antenna plane, and the radiation is a terminal-emitting radiation. The antenna has a sufficiently broad radiation beam along the direction of the maximum radiation, and having quasi-omnidirectional radiation characteristics, with a maximum radiation gain of 7.04 dBi. The antenna has a relatively low overall profile, a relatively high gain, and quasi-omnidirectional radiation characteristics. The present antenna can easily meet the requirements of wireless communication system designed for 5G millimeter wave band. As compared to the antenna depicted in FIG. 1A, the antenna depicted in FIG. 14A has substantially the same characteristics. Thus, a total number of rods in the director has little impact on the performance of the antenna, when the director has a plurality of rods of a same length. The antenna can be made smaller with two rods in the director.

In some embodiments, and referring to FIG. 2A, the antenna further includes a radio-frequency connector SMA configured to receive an external radio-frequency signal. The radio-frequency connector SMA is coupled to the dipole radiator RP.

In one example, the dielectric layer DL is made of a millimeter wave high frequency dielectric plate RO4003C, with a thickness of 0.305 mm and dk/df of 3.55/0.0027. In another example, the first conductive layer CL1 and the second conductive layer CL2 each have a thickness of 17 μm.

In another aspect, the present disclosure provide an electronic apparatus. In some embodiments, the electronic apparatus includes an antenna described herein, and one or more circuits. In one example, the electronic apparatus is a display apparatus. In some embodiments, the display apparatus includes a display panel and an antenna described herein connected to the display panel. Examples of appropriate display apparatuses include, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term “the invention”, “the present invention” or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use “first”, “second”, etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An antenna, comprising a reflector, a director; a first tapered microstrip line, a transition structure, a second tapered microstrip line, and a dipole radiator;

wherein the transition structure has a main body of a parallelogram shape having a first side connected to the first tapered microstrip line, a second side opposite to the first side and connected to the second tapered microstrip line, a third side connecting the first side and the second side, and a fourth side connecting the first side and the second side, the third side being opposite to the fourth side; and the transition structure comprises a plurality of teeth connected to and extending away from at least the fourth side of the main body.

2. The antenna of claim 1, comprising:

a first conductive layer comprising the reflector and the director;

a dielectric layer on the first conductive layer;

a second conductive layer on a side of the dielectric layer away from the first conductive layer, the second conductive layer comprising the first tapered microstrip line, the transition structure, and the second tapered microstrip line, the transition structure connecting the first tapered microstrip line with the second tapered microstrip line.

3. The antenna of claim 2, wherein the dipole radiator comprises a first radiator portion in the first conductive layer and a second radiator portion in the second conductive layer, the second radiator portion connecting to the first radiator portion through a via extending through the dielectric layer.

4. The antenna of claim 1, wherein an orthographic projection of the reflector on a dielectric layer at least partially overlaps with an orthographic projection of the transition structure, the first tapered microstrip line, and the second tapered microstrip line on the dielectric layer.

5. The antenna of claim 4, wherein the orthographic projection of the reflector on the dielectric layer covers the orthographic projection of the transition structure, the first tapered microstrip line, and the second tapered microstrip line on the dielectric layer.

6. The antenna of claim 1, wherein the transition structure comprises a plurality of teeth connected to and extending away from the third side and the fourth side of the main body, respectively.

7. The antenna of claim 1, wherein a unitary structure comprising the first tapered microstrip line, the transition structure, and the second tapered microstrip line has a mirror symmetry about a plane perpendicular to the transition structure.

8. The antenna of claim 7, wherein a combination of the first tapered microstrip line, the transition structure, the second tapered microstrip line, the reflector, and the director has a mirror symmetry about a plane perpendicular to the transition structure and the reflector.

9. The antenna of claim 1, wherein the transition structure comprises a plurality of teeth connected to and extending away from the fourth side of the main body;

the first tapered microstrip line is connected to the first side at a corner between the first side and the third side; and the second tapered microstrip line is connected to the second side at a corner between the second side and the third side.

10. The antenna of claim 1, wherein a combination of the reflector and the director has a mirror symmetry about a plane perpendicular to the reflector and the director.

11. The antenna of claim 10, wherein the first tapered microstrip line, the transition structure, and the second tapered microstrip line are limited in only one side of the plane about which the reflector and the director has a mirror symmetry.

12. The antenna of claim 1, wherein, on each side of the main body having multiple teeth, the multiple teeth are spaced apart by multiple slits, respectively;

the multiple teeth are equispaced; and the multiple slits are equispaced.

13. The antenna of claim 1, wherein the director comprises a plurality of rods that are parallelly arranged and equispaced; and the plurality of rods have a same length.

14. The antenna of claim 1, wherein the director comprises a plurality of rods that are parallelly arranged and equispaced; and lengths of the plurality of rods gradually decrease along a direction away from the reflector.

15. The antenna of claim 3, wherein the first tapered microstrip line connecting the second radiator portion with the transition structure on the first side; and the first radiator portion is connected with the reflector.

16. The antenna of claim 15, wherein the reflector comprises a tapered line portion and a rectangular portion;

the tapered line portion connects the first radiator portion with the rectangular portion; and a line width of the tapered line portion gradually decreases along a direction from the rectangular portion to the first radiator portion.

17. The antenna of claim 16, wherein a combination of the rectangular portion, the tapered line portion, and the director has a mirror symmetry about a plane perpendicular to the reflector and the director.

18. The antenna of claim 16, wherein an orthographic projection of the tapered line portion on a dielectric layer completely overlaps with an orthographic projection of the first tapered microstrip line on the dielectric layer.

19. The antenna of claim 3, wherein the first radiator portion (Original) comprises a first branch;

the second radiator portion comprises a second branch;

the first branch and the second branch are parallel to each other, and extending away from a position corresponding to the via along two opposite directions.

20. An electronic apparatus, comprising the antenna of claim 1.

* * * * *